(12) United States Patent
Duval et al.

(10) Patent No.: US 11,550,483 B2
(45) Date of Patent: Jan. 10, 2023

(54) TECHNIQUES FOR SECURE WRITES BY NON-PRIVILEGED USERS

(71) Applicant: Micron Technology, Inc., Boise, ID (US)

(72) Inventors: Olivier Duval, Pacifica, CA (US); Lance Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/165,569

(22) Filed: Feb. 2, 2021

(65) Prior Publication Data

US 2021/0223967 A1 Jul. 22, 2021

Related U.S. Application Data

(63) Continuation of application No. 16/352,551, filed on Mar. 13, 2019, now Pat. No. 10,936,213.

(51) Int. Cl.
*G06F 3/06* (2006.01)
*H04L 9/32* (2006.01)
*G06F 12/02* (2006.01)

(52) U.S. Cl.
CPC ............ *G06F 3/0622* (2013.01); *G06F 3/064* (2013.01); *G06F 3/0673* (2013.01); *H04L 9/3242* (2013.01); *H04L 9/3247* (2013.01); *G06F 12/0246* (2013.01)

(58) Field of Classification Search
CPC .... G06F 12/0246; G06F 3/064; G06F 3/0673; G06F 3/0622; H04L 9/3242; H04L 9/3247
USPC ......................................................... 711/163
See application file for complete search history.

(56) References Cited

U.S. PATENT DOCUMENTS

| 2016/0018991 A1* | 1/2016 | Flynn ...................... G06F 3/067 711/154 |
| 2016/0246529 A1* | 8/2016 | Kim ........................ G11C 16/16 |
| 2017/0357462 A1* | 12/2017 | Walker .................. G06F 3/0661 |

* cited by examiner

*Primary Examiner* — Hua J Song
(74) *Attorney, Agent, or Firm* — Holland & Hart LLP

(57) ABSTRACT

Methods, systems, and devices associated with techniques for secure writes by non-privileged users are described. A memory device may be configured with one or more blocks of memory operating in a secure write mode. The memory device may receive an append command from a non-privileged user. The append command may indicate data to write to the block of memory at an address determined by the memory device. The memory device may identify a pointer to the address for storing the data within the block of memory. The memory device may write the data to a portion of the block of memory based on identifying the pointer and may update the pointer associated with the block of memory based on writing the data.

22 Claims, 13 Drawing Sheets

TECHNIQUES FOR SECURE WRITES BY NON-PRIVILEGED USERS

CROSS REFERENCE

The present Application for Patent is a continuation of U.S. patent application Ser. No. 16/352,551 by Duval et al., entitled "TECHNIQUES FOR SECURE WRITES BY NON-PRIVILEGED USERS," filed Mar. 13, 2019, assigned to the assignee hereof, and is expressly incorporated by reference in its entirety herein.

BACKGROUND

The following relates generally to a system that includes at least one memory device and more specifically to techniques for secure writes by non-privileged users.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

Improving memory devices, generally, may include increasing memory cell density, increasing read/write speeds, increasing reliability, increasing data retention, reducing power consumption, reducing manufacturing costs, or increasing security of reading or writing data, among other metrics. Some memory cells may be configured to with security features to protect a memory device from a malicious attack.

DETAILED DESCRIPTION

Memory devices may be integrated into many different types of devices, including devices that are part of an internet of things (IoT) network. For example, a memory device may be integrated as part of a smart-meter that tracks a resource used by a building, such as electricity. Such devices may not always be secure from cybersecurity attacks. Improperly modifying some of the data stored on the memory device may affect larger systems, such as resource balancing or billing for utilities.

In some examples, a memory device may configure one or more blocks of memory to operate in a secure write mode in which a non-privileged host device may be capable of writing data to the blocks of memory array, but the non-privileged host device may not be capable of modifying data already written to the blocks of memory operating in the secure write mode. Certain commands related to blocks operating in a secure write mode may be issued by a privileged host device (e.g., different than the non-privileged host devices). Such commands may include a signature that is authenticatable by the memory device, but not by a non-privileged host device. As some examples, commands associated with blocks of memory operating in a secure write mode may include a modify command, a program command, an append command, a reset command, a configuration command, or a combination thereof. In some case, legacy write commands may not be supported for the one or more blocks of memory operating in the secure write mode. For example, a legacy write operation for writing to blocks of memory that are operating in non-secure mode may not be supported by the blocks operating in the secure write mode.

The memory device may receive an append command, for example, from a non-privileged device, to write data to the one or more blocks of memory operating in the secure write mode. The memory device may determine a destination address within the one or more blocks of memory operating in the secure write mode for storing the data indicated in the append command. In some cases, the memory device may identify a pointer to the address for storing the data within the block of memory and update the pointer after storing the data. The memory device may be configured to update the pointer such that stored data is not overwritten or modified by one or more subsequent append commands to write data.

Features of the disclosure are initially described in the context of a memory system as described with reference to FIG. 1. Features of the disclosure are described in the context a secure write system, process flow diagrams, and memory array diagrams as described with reference to FIGS. 2-5. These and other features of the disclosure are further illustrated by and described with reference to apparatus diagrams and flowcharts that relate to techniques for secure writes by non-privileged users as described with references to FIGS. 6-13.

Figure 1:
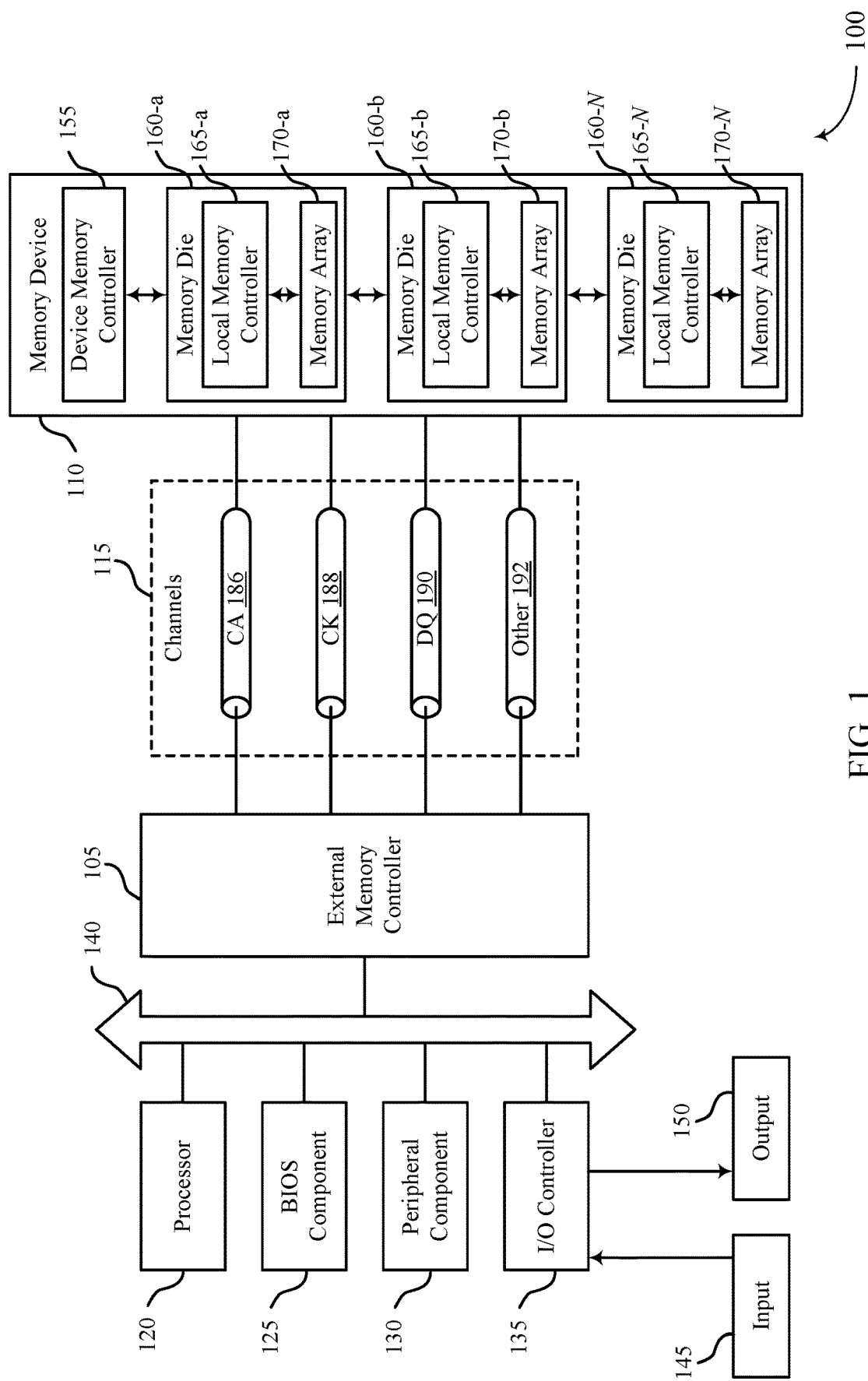
FIG. 1 illustrates an example of a system that supports techniques for secure writes by non-privileged users in accordance with examples as disclosed herein.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card.

In some cases, the system 100 may include multiple host devices. For example, the system 100 may include a remote device and an electronic device. In some cases, the remote device may be a separate device or structure from one or more components of the system 100. For example, the host device may be an external memory controller 105 separate from the memory device 110 and the electronic device. The electronic device may also be an external memory controller 105 that is on the same structure as the memory device. The remote device and electronic device may communicate (e.g., transmit or receive signals or commands) with one or more portions of the system 100. In some cases, the remote device and electronic device may communicate with each other, and each of these devices may communicate with the memory device 110, or other components of the system 100 such as input 145 or output 150 devices. In some cases, the remote device may communicate with the system using one or more wireless technologies such as telecommunications, cellular mobile communications (e.g., 4G, 5G, or the like), wireless networking (e.g., Wi-Fi, Bluetooth), or a combination thereof.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be x4 (e.g., including four signal paths), x8 (e.g., including eight signal paths), x16 (including sixteen signal paths), and so forth. Signals communicated over the channels may use double data rate (DDR) signaling. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any number of signal paths to decode address and command data (e.g., eight or nine signal paths).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110.

In some cases, the channels 115 may include one or more other channels 192 that may be dedicated to other purposes. These other channels 192 may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

A remote device may send one or more commands to the memory device 110. In some cases, the remote device may transmit a configuration command to the memory device 110. The memory device 110 may configure one or more segments of memory storage based on receiving the configuration command. For example, the memory device 110 may configure one or more blocks of memory cells in a secure write mode based on receiving the configuration command. In some case the memory device 110 may inform one or more host devices that it has configured one or more block of memory in the secure write mode. A host device, such as an electronic device may collect data and transmit an append command to the memory device 110 to store the collected data. In some examples, the append command may indicate to the memory device 110 that the data is to be stored using the secure write mode. In response, the memory device 110 may identify a location for storing the data in the one or more blocks of memory that are configured in the secure write mode. In some cases, the memory device 110 may prevent modification or limit operations that may be performed on data written in secure write mode. For example, the memory device may authenticate a host device before erasing data from or resetting the memory blocks configured in the secure write mode.

Figure 2:
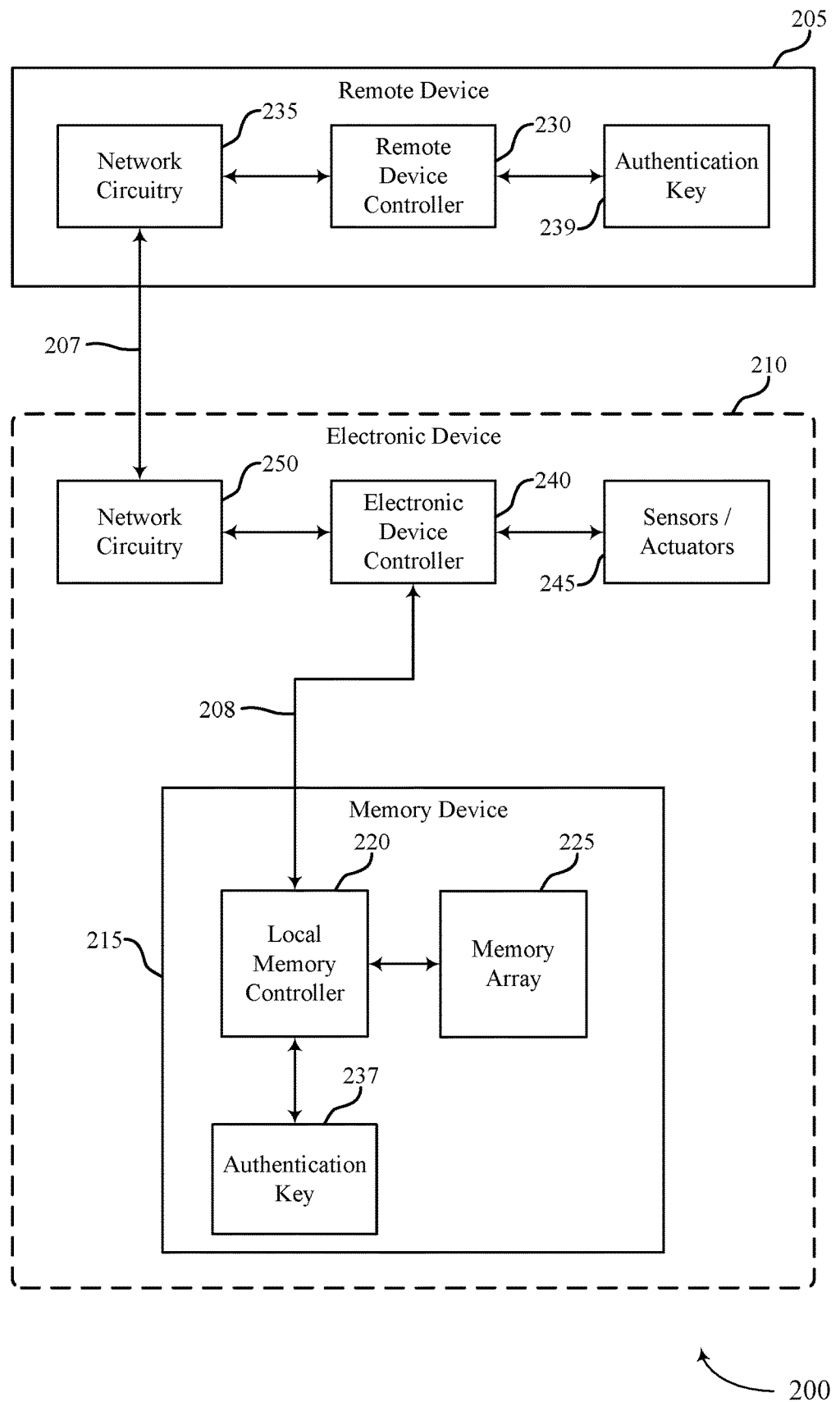
FIG. 2 illustrates an example of a secure write system that supports techniques for secure writes by non-privileged users in accordance with examples as disclosed herein.

FIG. 2 illustrates an example of a secure write system 200 in accordance with examples as disclosed herein. The secure write system 200 may be an example of the system 100 described with reference to FIG. 1. The secure write system 200 may include a remote device 205 and an electronic device 210 that includes a memory device 215. The secure write system 200 may refer to any system where the device (e.g., the electronic device 210) that is integrated with the memory device 215 is a non-privileged user of the memory device 215 while a remote device 205 is a privileged user of the memory device 215. In some cases, remote devices 205 may be examples of privileged users or non-privileged users of the memory device 215.

The secure write system 200 may be configured to store data in a manner that prevents the data from being modified or hacked by non-privileged users. There are many network-enabled devices (e.g., IoT devices) that gather information and report information back to centralized systems. Some of these devices may not be secure and the data stored thereon can be manipulated or altered. Having inaccurate or manipulated data may pose risks to central managed systems or may be used for improper purposes. Techniques are described herein to secure data collected and stored by the electronic device 210 (e.g., a non-privileged user), while allowing the remote device (e.g., a privileged user) to modify the data. The secure write system 200 may be configured with various commands (both authenticated commands and non-authenticated) to perform the functions described herein.

The electronic device 210 of the secure write system 200 may be an example of any network-enabled device. Examples of the electronic device 210 may include a personal computer, a laptop, a tablet, a handheld electronic device, or any combination thereof. Examples of the electronic device 210 may also include a network-enabled meter (e.g., for electricity, water, gas, or other resource), a security and/or automation system, a camera, a motion sensor, a light sensor, a microphone, a speaker, an appliance (e.g., refrigerator, television, fireplace, lighting, garage door opener, oven, coffeemaker, thermostat, a heating, ventilation, air conditioning system, alarm clock, a button or actuator), a network router (e.g., wired, wireless or both), an irrigation system controller, a doorbell camera, a door lock, a location tracker, or any combination thereof.

The electronic device 210 may include the memory device 215, a controller 240, one or more sensors/actuators 245, and network circuitry 250. The one or more sensors/actuators 245 may be configured to measure one or more conditions (e.g., temperature, light, flow, or other characteristics) or actuate or activate one or more processes based on electrical commands (e.g., activate an appliance or valve) or a combination thereof. The controller 240 of the electronic device 210 may be configured to communicate data and control information with the sensors/actuators 245. The controller 240 may also be configured to store data collected by the sensors in the memory device 215. In some cases, the controller 240 of the electronic device 210 may be an example of a host controller or local host controller of the memory device 215. The controller 240 may be an example of an external memory controller 105, a device memory controller 155 or local memory controller 165 described with reference to FIG. 1.

Some electronic devices 210 may be better at securing data (e.g., ensuring that data is not impermissibly altered) than other electronic devices. Manipulating the data stored by the electronic device 210 or the data communicated by the electronic device 210 may be done by bad actors for their own purposes and may disrupt other systems. For example, a resident may desire to alter the data of an electrical meter to lower his or her utility bill. Techniques are described herein for securing the data of the electronic device 210 stored on the memory device while allowing authenticated users (or privileged users) (e.g., the utility company) the ability to read and alter the memory device 215 on the electronic device 210. The memory device 215 of the electronic device 210 may include a local memory controller 220, which may be an example of device memory controller 155, or local memory controller 165 described with reference to FIG. 1; a memory array 225, which may be an example of a memory array 170 described with reference to FIG. 1.

The electronic device 210 may also include network circuitry 250 for communicating information with one or more remote devices 205. The network circuitry 250 may be configured to communicate data over wired networks (e.g., Ethernet or USB connections), wireless networks (e.g., Bluetooth, Wi-Fi, cellular data services such as 3G, 4G or 4G, near-field communications, or other radio access technology), or a combination thereof.

The remote device 205 may be an example of an authenticated user privileged user that is capable of configuring blocks of memory the memory device 215, reading data from the memory device 215, resetting the memory device 215, modifying or altering the data stored on the memory device 215, or a combination thereof. Examples of the remote device 205 may include a computing device configured to collect data or communicate control information with an electronic device, a server located at a remote location, or a combination thereof.

The remote device 205 may include a controller 230, which may be an example of an external memory controller 105, a device memory controller 155 or local memory controller 165 described with reference to FIG. 1; network circuitry 235; and an authentication key 239. The controller 230 of the remote device may be configured to control various aspects of the remote device 205. The network circuitry 235 may be configured to communicate information with one or more electronic devices 210. The network circuitry 235 may be configured to communicate data over wired networks (e.g., Ethernet or USB connections), wireless networks (e.g., Bluetooth, Wi-Fi, cellular data services such as 3G, 4G or 4G, near-field communications, or other radio access technology), or a combination thereof. In some cases, the controller 230 of the remote device may be an example of a host controller or local host controller of the memory device 215. The controller 230 may be an example of an external memory controller 105, a device memory controller 155 or local memory controller 165 described with reference to FIG. 1.

The electronic device 210 may be configured to perform one or more of metering, measuring, sensing or similar operations and the memory device 215 may write or store data associated with the operations performed by the electronic device 210. In some cases, the memory device 215 and electronic device 210 may be incorporated or housed on the same physical device. In other examples, the memory device 215 may be a separate physical structure from the electronic device 210.

The electronic device 210 or memory device 215 may also be associated with a remote device 205. In some cases, the remote device 205 may be a device that communicates authenticated commands to the memory device 215 through the electronic device 210 acting as an intermediary. The remote device 205 may configure one or more operational parameters of electronic device 210. In some cases, this may include parameters related to taking measurements, sensing operations or metering operations. The remote device 205 may send one or more commands relating to an operating mode of memory device 215. In some cases, the remote device 205 may transmit commands to the controller 230, which may be processed at the controller 240 and implemented by electronic device 210. In other cases, the electronic device 210 may identify the commands as intended for the memory device 215 and transmit the command to the local memory controller 220. In some examples, the remote device 205 may send commands directly to the memory device 215.

Communications, commands, data transmissions between the remote device 205 and the electronic device 210 may be communicated over one of more communication links 207 using the network circuitry 235 and 250. In some cases, the communication links 207 may include wired or wireless communications or combinations thereof. For example, the remote device 205 may communicate wirelessly over cellular communications links (e.g., LTE, 5G, Wi-Fi, or the like). The electronic device 210 may also communicate with the local memory device through wired or wireless communications. Communications, commands, data transmissions between the electronic device 210 and the memory device 215 may be communicated over wired data paths. In some cases, an interface, such as a ballout, may positioned in the signal path between the electronic device 210 and the memory device 215.

The local memory controller 220 may control the operation of the memory array 225 through the various components (e.g., row decoder, column decoder, and sense component). The local memory controller 220 may be configured to receive commands and/or data from an external host device (e.g., electronic device 210 or remote device 205), translate the commands and/or data into information that can be used by the memory device 215, perform one or more operations on the memory device 215, and communicate data from the memory device 215 to the an external host device (e.g., controller 240 or controller 230 or a combination thereof) in response to performing the one or more operations. The local memory controller 220 may generate memory address signals for performing one or more access operations (e.g., read, write, etc.). The local memory controller 220 may also generate and control various voltages or currents used during the operation of the memory device 215. In general, the amplitude, shape, or duration of an applied voltage or current discussed herein may be adjusted or varied and may be different for the various operations discussed in operating the memory device 215.

In some cases, the local memory controller 220 may be configured to perform a write operation (e.g., a programming operation) on one or more memory cells of the memory array 225. During a write operation, a memory cell of the memory array 225 may be programmed to store a desired logic state in a memory cell or store a plurality of desired logic states in a plurality of memory cells.

The local memory controller 220 may be configured to perform secure writes to memory array 225. In some cases, the secure write mode may include configuring one or more sections (e.g., banks) of the memory array 225 in a secure write mode. Banks of the memory array 225 operating in a secure write mode may prevent data written to the secure banks from being modified without an authentication parameter. For example, the local memory controller 220 may prevent data written to banks operating in the secure write mode from being modified by subsequent write commands. In some cases, this may include local memory controller 220 determining/controlling the write address within the block of memory operating in the secure write mode. For a secure write mode write operation, the local memory controller 220 may identify a block of memory and an address within the memory array 225.

In some cases, the local memory controller 220 may perform one or more secure write operations. For example, the local memory controller 220 may include a register for the banks of the memory array 225 operating in the secure write mode. In some cases, the local memory controller 220 may update a pointer based on writes to banks operating in the secure write mode. For example, the local memory controller 220 may identify addresses that have secure data written to them and addresses that are open (e.g., addresses which do not have secure data written). In this regard, the local memory controller 220 may interface with the memory array 225 to perform write operations on banks operating in the secure write mode. In some cases, the local memory controller 220 and the memory array 225 may share circuitry or be integrated to perform control operation for the memory device 215 as described herein.

In some cases, the local memory controller 220 may access an authentication key 237 to perform one or more secure write operations. In some cases, the local memory controller 220 may verify that a command received at the memory device is from an authorized device (e.g., authorized host device). For example, the remote device 205 may encrypt or secure a command for the memory device 215 based on an authentication key 239 stored at the remote device 205. The remote device 205 may transmit the encrypted or secured command to the memory device 215 via the electronic device 210. In some cases, the electronic device 210 may not include an authentication key, for example, to protect encrypted or secured messages. In this regard, electronic device 210 may transmit the encrypted or secured message to the memory device 215. The local memory controller 220 may access an authentication key 237 used for verifying that a command is from an authorized device. In some cases, the authentication key 239 stored at the remote device 205 and the authentication key 237 stored at the memory device 215 may be complimentary keys (e.g., private keys, public-private key pairs, or the like). In some cases, the local memory controller 220 may perform one or more authentication operations. For example, the local memory controller may verify that a command is authorized based on a message authentication code (MAC), such as a keyed-hash MAC (HMAC), cryptographic hash function, a digital signature, or the like, or a combination thereof. In some examples, one or more of these authentication procedures may be performed using an authentication key 237 located on memory device 215. In some cases, upon the local memory controller verifying that a command is from an authorized device, the local memory controller 220 may perform the command at the memory device 215.

Authentication of encrypted or secured commands may occur in a variety of ways. For example, the authentication key 237 may be contained within the memory device 215 and hidden or otherwise inaccessible to the electronic device 210. In some cases, the authentication key 237 may be only known or shared with the remote host device, for example as a paired authentication key 239. In some cases, the authentication key 237 may be embedded in the memory device during manufacturing. Accordingly, the electronic device 210 may not have access to the authentication key 237. Thus, in some cases, the remote device 205 may send commands to memory device 215 that components of the electronic device 210 (e.g., network circuitry 250, controller 240, or sensors/actuators 245) cannot access. In some cases, the memory device 215 may receive and perform commands from the remote device 205 that are not available to components of the electronic device 210.

The local memory controller 220 may be configured to perform a read operation (e.g., a sense operation) on one or more memory cells of the memory array 225. During a read operation, the logic state stored in a memory cell of the memory array 225 may be determined. In some cases, a plurality of memory cells may be sensed during a single read operation. The local memory controller 220 may communicate the logic state stored on the memory cell or data associated with one or more logic states to an external memory device such as the electronic device 210 or remote device 205.

In some cases, the controller 240 may provide an interface between the remote device 205 and the memory device 215. Additionally or alternatively, the controller 240 may be configured to perform one or more operations for electronic device 210. For example, the electronic device 210 may include one or more sensors/actuators 245, which may be examples of one or more sensors, meters, data loggers, stimulus sensing components, or other devices as described herein. In some cases, the sensors/actuators 245 may collect data for storage on the memory device 215. Data may be related to external stimulus such as temperature, pressure, brightness, force, moisture content, or the like. Additionally or alternatively, the sensors/actuators 245 may collect data related to usage of a resource such an electricity, water, etc. The sensors/actuators 245 may transmit one or more signal related to the collection of data to the controller 240. In some cases, the sensors/actuators 245 or controller 240 may convert signal from the collection of data to digital data for storing on memory device 215.

Additionally or alternatively, the controller 240 may transmit data collected by the sensors/actuators 245 to the memory device for 205 for storage. In some cases, the controller 240 may send one or more commands to memory device 215 for storing the data. This may include commands indicating that data should be written to memory banks operating in a secure write mode.

In some examples, the remote device 205 may include a controller 230 for performing one or more operations associated with storing data on the memory device 215. For example, the controller 230 may send commands to the electronic device 210 or memory device 215 for configuring either the electronic device 210 or the memory device 215. This may include, configuring one or more data collection parameters (e.g., frequency, triggering event, measurement accuracy, etc.) for the electronic device 210. In some examples, the controller 230 may transmit commands to configure the memory device 215. For example, a modify command for the memory device 215 to configure one or more banks of the memory array 225 in a secure write mode.

Figure 3:
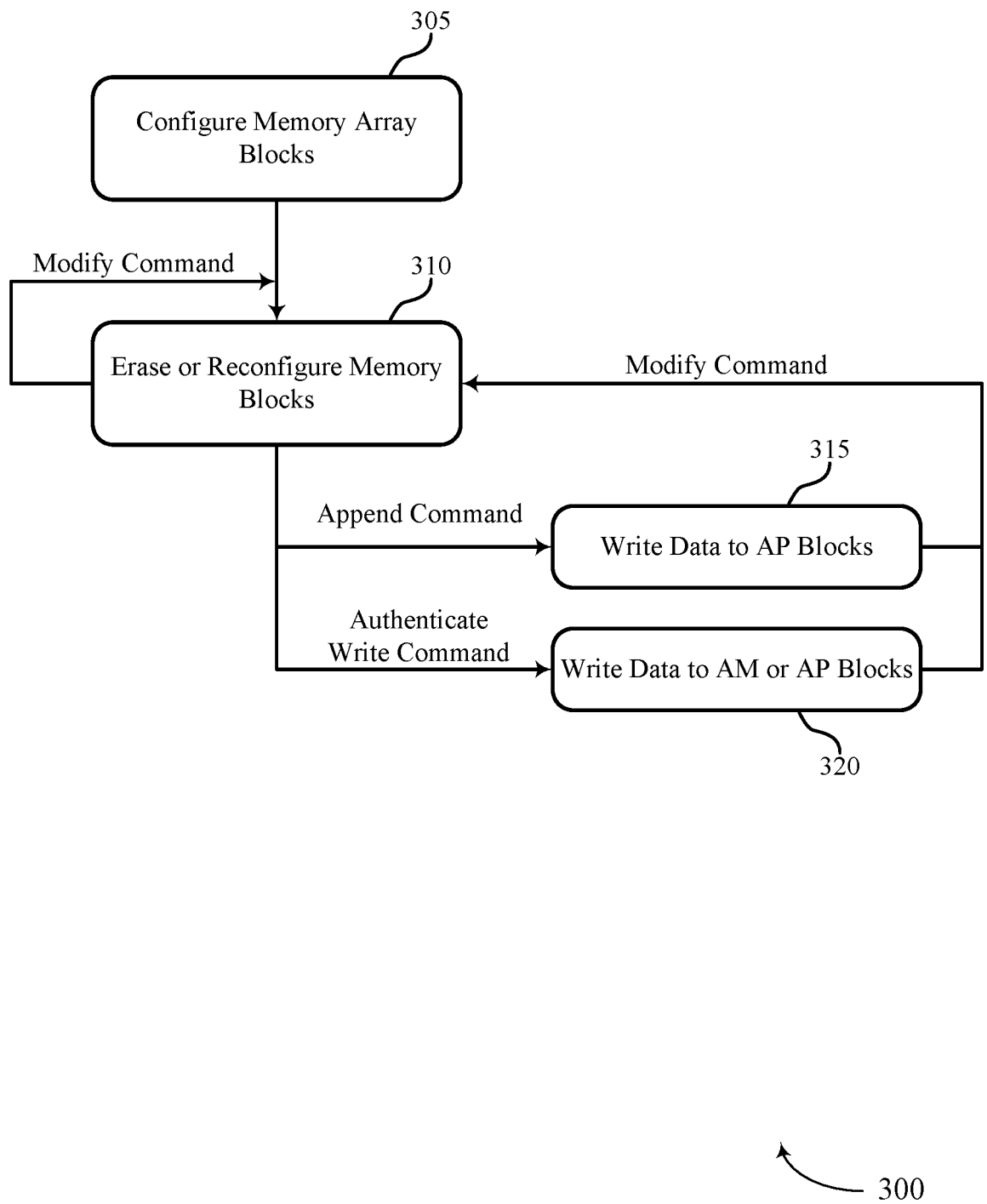
FIG. 3 illustrates an example of a process flow that supports techniques for secure writes by non-privileged users in accordance with examples as disclosed herein.

FIG. 3 illustrates an example of a process flow 300 that supports techniques for secure writes by non-privileged users in accordance with examples as disclosed herein. The process flow 300 may be performed by one or more components of a secure write system, such as the secure write system 200 described with reference to FIG. 2. In some cases, process flow 300 may be performed by a memory device, which may be an example of the memory device 110, 215 described with reference to FIGS. 1 and 2; an electronic device, which may be an example of electronic device 210 described with reference to FIG. 2; or a remote device, which may be an example of the remote device 205 described with reference to FIG. 2, or a combination thereof. The process flow 300 may illustrate processes of a secured write system operating in a secured write mode.

One or more blocks of a memory device may be configured to operate in a secured write mode to prevent non-privileged users for modifying the data stored in those blocks. The blocks of memory operating in the secured write mode may be an example of a secure log where a non-privileged user is capable of writing to the block of memory, but is not capable of modifying any data already stored in the block of memory. Such a configuration may improve the confidence that data collected from an electronic device and reported to a remote device is accurate.

The memory device may be configured to perform operations on a memory array in response to receiving one or more commands from one or more host devices. In some cases, commands may be received from privileged host devices (e.g., the remote device) and, in other cases, commands may be received from non-privileged host devices (e.g., the electronic device). The memory device may have an authentication key stored in a register that is not accessible by the electronic device. The memory device may determine (or authenticate) whether a command is received from a privileged host device using the authentication key.

At 305, one or more blocks of memory of a memory array of a memory device may be configured into a mode of operation. The modes of operation mode include a legacy mode, an authentication mode, and an append mode (e.g., a secure write mode). In blocks of memory that operate in a legacy mode, non-privileged users (e.g., the electronic device) may have full permissions to read, write, and modify stored in those blocks. In blocks of memory that operate in authentication mode, privileged users may have full permissions to read, write, and modify stored data in those blocks and non-privileged users may not have any permissions. In blocks of memory the operate in append mode, non-privileged users may have permission to write data using one or more secure mode commands (e.g., an append command) but not modify data using non-secure mode commands (e.g., legacy erase or write commands) and privileged users may have full permissions to read, write, and modify stored in those blocks.

For memory blocks operating in an append mode, there may be a variety of commands used to operate the memory device. Some examples of these commands may include a modify command, an append command, and an authenticate write command. The modify command may be used to erase or reconfigure a memory block to operate in a different mode. For append mode memory blocks, privileged users are capable of issuing the modify command, which includes data indicating an authentication key not possessed by non-privileged users (e.g., electronic device). The append command may be used to write data to memory blocks without an authentication procedure. For append mode memory blocks, non-privileged users may use the append command to write data. The append command does not include an address to which the data will be written in memory. Rather, the append command includes an indication of the block of memory that is to store the data and the memory device is configured to identify the specific address for storing the data. In this manner, the non-privileged users may be prevented from modifying the stored data because the non-privileged users do not have control over where the data is stored. The authenticate write command may use an authentication procedure to write data to memory blocks. The authenticate write command allows privileged users to modify any data stored in the append mode memory blocks. For append mode memory blocks, privileged users are capable of issuing the authenticate write command, which includes data indicating a signature associated with an authentication key not possessed by non-privileged users (e.g., electronic device).

In some examples, secure write mode (or append mode) may refer to writing or storing data at memory blocks configured to prevent modification of the data once it has been written. For example, a memory device operating in a secured write mode may perform an append command to write data to memory blocks such that once the data is stored or written on memory blocks is cannot be modified or overwritten without performing an authentication procedure. In some cases, this may include performing an authentication procedure before erasing or modifying data stored on memory blocks operating in the secure write mode.

A command that performs one or more operations (e.g., read, write, erase, etc.) on memory blocks operating in the authentication mode may be require an authentication procedure to verify that the device transmitting the commands is an authorized device. For example, when a memory block is configured in the authentication mode, a write command may be authenticated before the write procedure is carried out on the blocks operating in the authentication mode. In some cases, a host device (e.g., remote device 205) may send a modify command to configure one or more memory blocks as blocks operating in the authentication mode. In some, cases memory blocks may originally be in the legacy mode, which does not require an authentication procedure to perform a command. In this regard, memory blocks may be configured to blocks operating in the authentication mode with our requiring an authentication procedure such as HMAC.

In some examples, once memory blocks have been configured as authentication mode blocks any subsequent commands may require an authentication procedure (e.g., HMAC, cryptographic hash function, digital signature, or the like). For example, at 310, blocks operating in the authentication mode may be erased or reconfigured to operate in a different mode by performing a modify command including an authentication procedure. For example, an authenticated erase command may be required to erase or rest a block operating in the authentication mode. In other examples an authenticated modify command may be required to reconfigure the block from a block operating in the authentication mode.

In some cases, a block operating in the authentication mode may be reconfigured to operate in a secure write mode, which may be referred to as an append mode or an AP memory block. For example, at 310 the modify command including an authentication procedure may be performed to reconfigure a block operating in the authentication mode to be a block operating in an append mode. In this example, memory blocks would require at least one authentication procedure to be configured as an AP block. In some cases, a block operating in a legacy or free mode may be reconfigured to operate in a secure write mode directly. Additionally or alternatively, the memory device may not modify or erase an AP block unless an authentication procedure is performed. For example, the memory device may be configured to perform an authentication procedure prior to performing a modify command to erase or reconfigure the AP block at 310. In this regard, non-authenticated devices (e.g., local host device) may write data to the AP memory blocks but be unable to modify or erase data on the AP memory blocks.

At 315, an append command may be issued to write data to AP memory blocks without performing an authentication procedure (e.g., non-authenticated write). The append command may include the data to be written, an indicator of the block of memory operating in append mode that is to store data, other information or a combination thereof. The append command may not include a signature related to an authentication key of a privileged user and it may not include a destination address for the data. The memory device may be configured to identify the destination address for data written using an append command to prevent the non-privileged user (e.g., electronic device) from controlling the location of the stored data.

At 320, an authenticate write command may be issued to write data to AP memory blocks or AM memory blocks with performing an authentication procedure. The authenticate write command may include a signature related to an authentication key indicating to the memory device that the write operation is issued by a privileged user. To write data to specific addresses of AP blocks or AM blocks authentication procedures may be used. The authenticate write command may include a destination address of the data and a signature related to the authentication key. In this manner, some operations on AP blocks may be restricted to be performed by privileged users.

Figure 4:
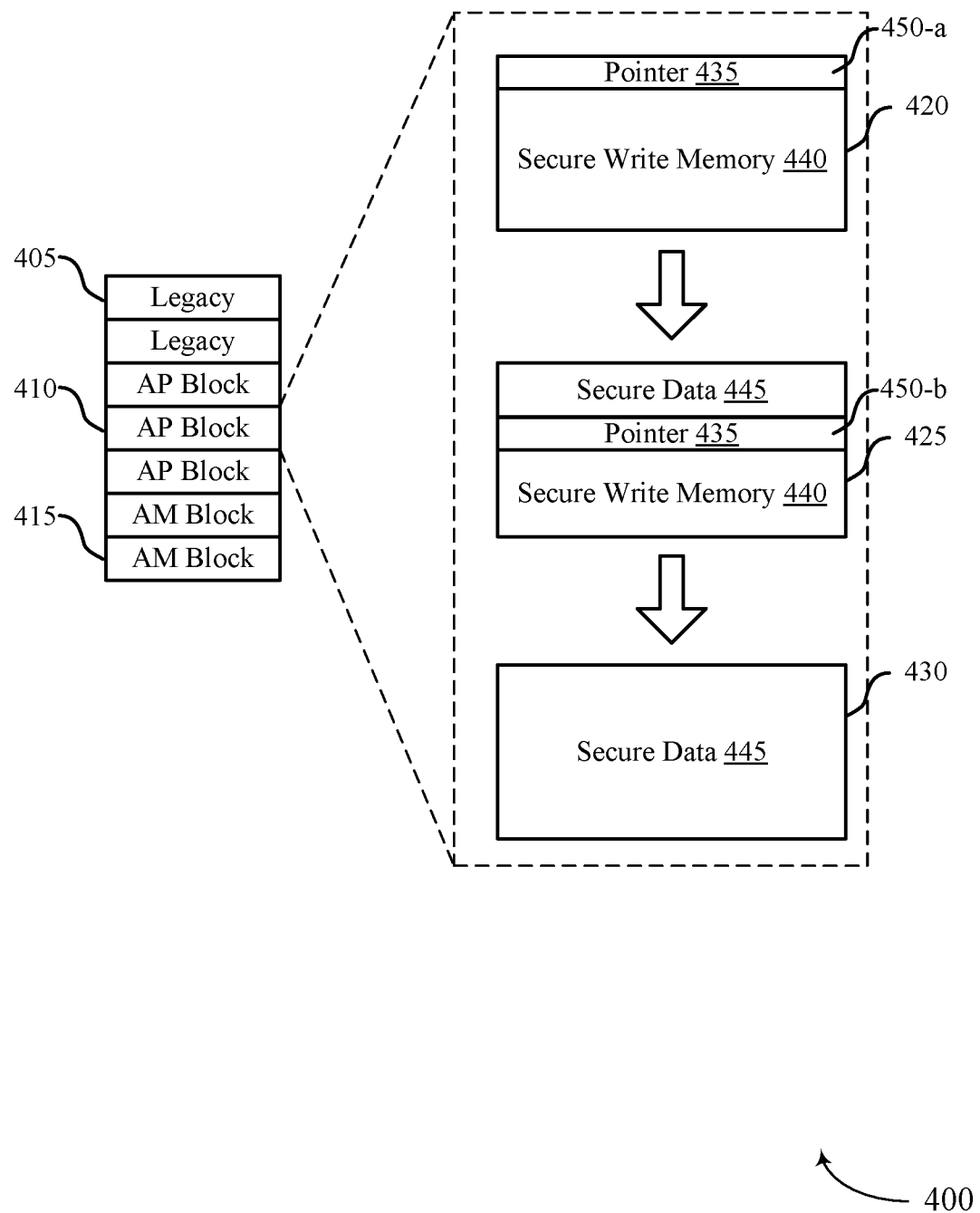
FIG. 4 illustrates an example of a memory array that supports techniques for secure writes by non-privileged users in accordance with examples as disclosed herein.

FIG. 4 illustrates an example of a memory array 400 that supports techniques for secure writes by non-privileged users in accordance with examples as disclosed herein. The memory array 400 may be an example of memory arrays 170, 225 described with reference to FIGS. 1 and 2. The memory array may include one or more memory blocks 405, 410, 415, which may be examples of memory blocks discussed herein. In some cases, the memory array 400 may include legacy memory blocks 404 configured to operate in a legacy mode, AP memory blocks 410 configured to operate in a secured write mode (or append mode), and AM memory blocks 415 configured to operate in an authentication mode. The memory array 400 may include a pointer 435 for writing data to AP memory blocks 410.

The legacy memory blocks 405 may be freely written to and read from by non-privileged users (e.g., electronic device). For example, access operations associated with one or more commands (e.g., read, write, erase, etc.) may be performed on legacy memory blocks without performing an authentication procedure. In this regard, any host device (whether a privileged host device or non-privileged host device) associated with memory device may read, write, erase or modify data stored on legacy memory blocks.

The AM memory blocks 415 may be configured as described herein. In some cases, legacy memory blocks 405 may be configured as AM blocks 415 without performing an authentication procedure. In some examples, access operations associated with one or more command s(e.g., read, write, erase, etc.) may require an authentication procedure. In this regard, authorized host devices (e.g., host device that have an authentication parameter such a key) may read, write, erase or modify data stored on AM memory blocks 415.

The AP memory blocks 410 may operate as a secure log where non-privileged host devices have written permissions and privileged host devices have read/write/overwrite/modify permissions. In some examples, an authentication procedure may be used to configured blocks of the memory array 400 as AP memory blocks 410. Accordingly, in some examples, only privileged host devices (e.g., remote device) may configure the memory array 400 to operate in a secure write mode.

When memory blocks operate in a secure write mode, non-privileged host devices may be restricted from modifying data written to the AP memory blocks 410. For example, a memory device may indicate that an AP memory block 410 is operating in the secure write mode. In some cases, the memory device may manage data writes to an AP memory block 410 using a pointer 435. For example, a memory device may control the location data is written to within the AP memory block 410 using the pointer 435. In this regard, a host device may send an indication that data is to be written to the AP memory block 410, for example, by identify the AP memory block 410 configured in the secure write mode. The memory device may then control the address location for writing data to the AP block 410 using the pointer 435. Accordingly, in some examples, the memory device controls the location where data is written to in the secure write mode. The operation of an AP memory block 410 is illustrated using three states 420, 425, 430. These three states 420, 425, 430 are examples of various states of AP memory block 410 and are not limiting.

At a first state 420 (e.g., an initial state) no data may be written to the AP memory block 410, and the pointer 435-a may identify a first location within the AP memory block 410 for writing data. The unwritten portions of the AP memory block 410 may be referred to as secure write memory 440 and the portions that store data may be referred to as secure data 445. Accordingly, the memory device may receive an append command and write data to the AP memory block 410 based on an initial location 450-a. Specifically, the memory device may identify the block of memory that is to store the data. The memory device may identify the pointer associated with the block of memory indicated by the append command. The memory device may identify the address to store the data in the memory block based on the pointer 435.

Upon writing data to the AP memory block 410 the memory device may update the pointer to a second pointer location 450-b. In this case, the AP block 410 may have a portion of secure data 445, and a portion of secure write memory 440 for writing additional data. When updating the location of the pointer 435, the memory device may use wear leveling techniques. If the memory device always run through the block of memory in the same pattern (e.g., linearly), some memory cells will be written too many times and other memory cells will be written to less times. Over time, this may cause some memory cells to wear out and introduce errors, while other memory cells have been underutilized. To extend the useful life of the memory device, the memory device may select new locations for the pointer based on wear-leveling techniques. Such wear leveling-techniques may be configured to cause memory cells of the block to be used evenly over the life of the memory device. In some cases, the memory device may use a random or pseudo-random sequence of locations for the pointer. In some case, the memory device may use a predetermined pattern of locations to achieve wear-leveling. Examples also include updating the pointer location 450 based on wear leveling operations. In some cases, a wear level operation may cause the pointer location 450 may cycle through each address location within the one or more AP blocks before writing to a same location a subsequent time. In other examples, the wear leveling operation may cause the pointer location 450 to change based on a pattern or sequence. In an event, the wear leveling operation may update the pointer location 450 to distribute memory cycles across the one or more AP memory blocks to reduce difference in wear rates between memory cells of the memory array.

At a second state 425, the memory device may receive a second append command (e.g., a subsequent append command) to write data to the AP memory block 410. In some case, the append command may indicate that the data is to be written to the AP memory block 410 and the append command may include an identifier that indicates the AP memory block 410 to store the data. The memory device may determine a second address to write the data based on the second location 450-b of the pointer 435. The memory device may write the data to the AP memory block 410 based on the second location 450-b of the pointer 435 and may update the pointer 435 to an updated location. In some examples, the memory device may continually receive append commands identifying the AP block 410, identify a pointer location 450, write data to the AP memory block 410 based on the pointer location 450 and update the pointer location 450.

In some cases, the append command may identify that data is to be written to the AP block by indicating to the memory device that the data is to be written in a secure write mode. In this regard, the memory device may identify both the AP memory block 410 and an address location within the AP memory block for writing the data. In some cases, the act of receiving an append command may indicate that data is to be written to the AP block. the append command may be a separate command such that the append command may not include an indication of the AP memory block. Rather, the memory device may select the AP memory block based on receiving the append command.

At a third state 430, the memory device may receive an append command to write data to the AP memory block 410. The memory device may determine that the AP memory block is filled with secure data 445. In some cases, the memory device may identify a second AP block for writing data in the secure write mode. In such cases, the memory device may store information that the data was written to a different AP block. In such cases, the memory device may send signaling to the host device that the selected AP block is full. In future append commands, the host device may select a new AP block to store data as part of an append command. In other cases, the memory device may determine that no other AP blocks are available and not write the data to an AP block. In some cases, the memory device may send signaling to the host device that issued the append command that the AP blocks are full and indicate that the data was not written to the AP memory block. Additionally or alternatively, the memory device may send signaling to the host device including an error message based on the AP blocks being full. In some cases, the error message may indicate that the memory device did not write the data to the AP memory block 410.

In some examples, the pointer 435 is updated by the memory device to prevent secure data 445 from being overwritten or modified by subsequent append commands. For example, if an append command is received that specifies an address within the AP block 410, the memory device may ensure that data associated with this append command does not overwrite secure data 445. For example, the memory device may ignore the address and write data to the AP memory block 410 based on the current pointer location 450.

In cases where the memory block is filled with secure data 445, the AP memory block may be erased or reset to update the pointer to an initial pointer location 450-a based on an authentication procedure associated with a modify command. In some cases, resetting the pointer to an initial pointer location 450-a may indicate that the AP memory block 410 is available to writing data to the secure write memory 440 portions.

Figure 5:
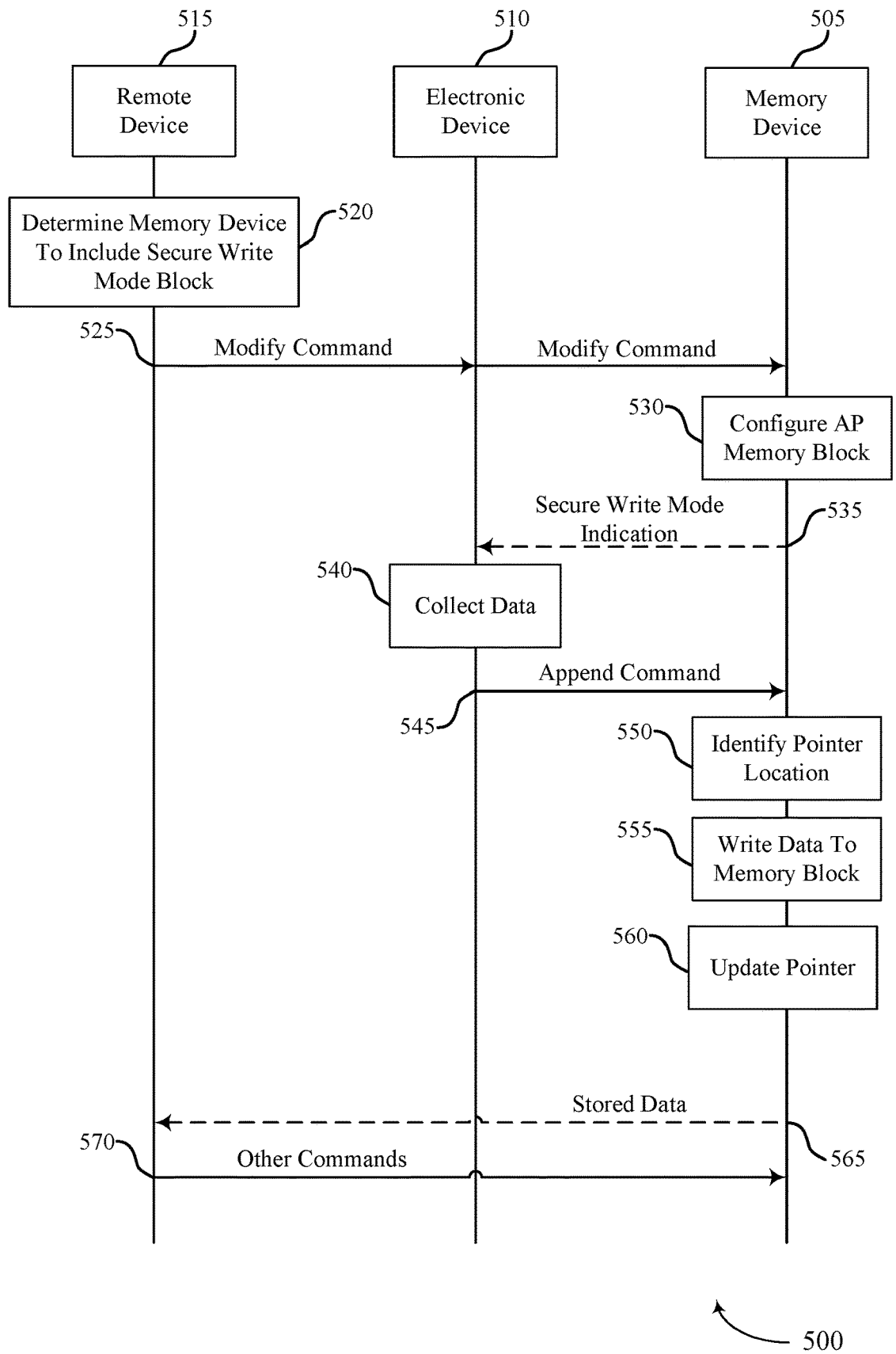
FIG. 5 illustrates an example of a process flow that supports techniques for secure writes by non-privileged users in accordance with examples as disclosed herein.

FIG. 5 illustrates an example of a process flow 500 that supports techniques for secure writes by non-privileged users in accordance with examples as disclosed herein. The process flow 500 may include a remote device 515 (e.g., a privileged user), which may be an example of remote device 205 described with reference to FIG. 2; an electronic device 510 (e.g., a non-privileged user integrated with the memory device), which may be an example of the electronic device 210 described with reference to FIG. 2; and memory device 505, which may be an example of memory device 215 described with reference to FIG. 2.

At 520, the remote device 515, which is a privileged user, may determine that the memory device 505 is to include one or more blocks of memory operating in a secure write mode. The remote device 515 may make this determination based on a determination that the electronic device 510, which is integrated with the memory device 505, should not be configured to modify at least some data stored on the memory device 505, including some data written by the electronic device 510.

At 525, the remote device 515 may transmit a modify command to the memory device 505. In some cases, the modify command may be received by electronic device 510 (e.g., through the network circuitry of the electronic device) and relayed to the memory device 505 based on the electronic device 510 determining that the modify command is intended for the memory device 505. In such cases, the electronic device 510 may be a pass-through entity for some commands. The modify command may include an authentication parameter such as a signature or a key associated with an authentication procedure (e.g., HMAC) between the memory device 505 and the remote device 515. The electronic device 510 may not include an authentication key to authenticate the signature in the modify command or to generate a modify command on its own. The memory device 505, after receiving the modify command, may perform an authentication procedure to determine whether the modify command originated from a privileged user. The memory device 505 may configure the memory device based on the authentication procedure indicating that the command came from a privileged user.

At 530, the memory device 505 may configure one or more memory blocks of the memory array to operate in a secure write mode. In some cases, configuring the memory blocks to operate in a secure write mode may include verifying that the remote device 515 is authorized to configure the memory device 505.

At 535, the memory device 505 may transmit an indication to the electronic device 510 that at least some block of the memory device are operating in the secure write mode. In some cases, this may include informing the electronic device 510 of the identity of one or more of the blocks operating in the secure write mode.

At 540, the electronic device 510 may collect data for storing at the memory device as described herein. In some cases, this may include converting or digitizing data collected at a sensor to one or more logic states for storage on the memory device 505. Additionally or alternatively, the electronic device 510 may identify information associated with sensors or actuators of the electronic device 510. The electronic device 510 may desire to store some or all of this information in the memory device 505.

At 545, the electronic device 510 may transmit an append command including the data to be stored on the memory device 505. The data to be stored in the memory device 505 may be related to the sensors or actuators of the electronic device 510. In some cases, the append command may identify a memory block operating in a secure write mode for storing the data. The append command may not include a specific address for storing the data because the destination address for data stored using the append command may be determined by the memory device 505. The append command may not include a signature for authentication because the append command may be issued by non-privileged users or privileged users.

At 550, the memory device 505 may identify a pointer location within the AP memory block for storing the data based on receiving the append command. In some cases, the memory device 505 may first identify the block of memory operating in the secure write mode that is to store the data. Identifying the pointer may be based on identifying the block. The pointer may indicate a destination address for writing data of the append command in the indicated block of memory.

At 555, the memory device may write the data to the memory block at the address indicated by the pointer. In some cases, the memory device 505 may prevent data written to the memory block operating in the secure write mode from being modified by another append command. To accomplish this, the memory device 505 may manage the pointer such that the memory device prevents the pointer from indicating a destination address in the block of memory that already stores information.

At 560, the memory device 505 may update the pointer to a new location based on writing the data to the memory block operating in the secure write mode. In some case, the pointer is updated based on the size of data written to the memory array. In some examples, the memory device 505 may configure the pointer such that it updates to a location where data has not been stored to an memory block operating in the secure write mode. Is some cases, the pointer is updated base on a wear leveling procedure at the memory array. This may include updating the pointer sequentially, in a pattern, sequence, or the like. In some cases, the memory device 505 may update the pointer based on a wear-leveling procedure or operation as described herein.

The memory device 505 may receive a plurality of append command from the electronic device 510 and repeat steps 550-560 until one or more of the memory blocks operating in the secure write mode are filled or another event triggers memory device to stop storing data using the secure write mode. In some cases, after the block of memory operating in the secure write mode is filled, the memory device 505 may select a new block of memory store the data and then inform the electronic device 510 that a new block is being used for append commands. In some cases, after the block of memory operating in the secure write mode is filled, the memory device 505 may send an error message to the electronic device 510 and not store the data.

At 565, the memory device 505 may transmit stored data on the block of memory operating in the secure write mode to the remote device 515 (e.g., a privileged user). In some cases, this may be in response to a request (e.g., a read command) from the remote device 515 to the memory device 505. In some cases, the read command may include a signature related to an authentication key and the read command issued by a privileged user. In some cases, the read command may be issued by a non-privileged user. In some cases, the data transferred in step 565 can be an indication signal, for example, when one or more append blocks are full.

At 570, the remote device 515 may transmit one or more other commands to the memory device 505. These other commands may include a signature related to an authentication key, in some cases. Example of the other commands may include an authorize write command or a reset command. The authorize write command may allow the issuer to modify or overwrite data stored in block of memory operating in a secure write mode. The reset command may reset the block of memory operating in the secure write mode, which may include reset the pointer location or update a register to indicate that one or more address in the block of memory operating in the secure write mode are available to be written with data. In some cases, the reset command may be an example of a modify command.

Figure 6:
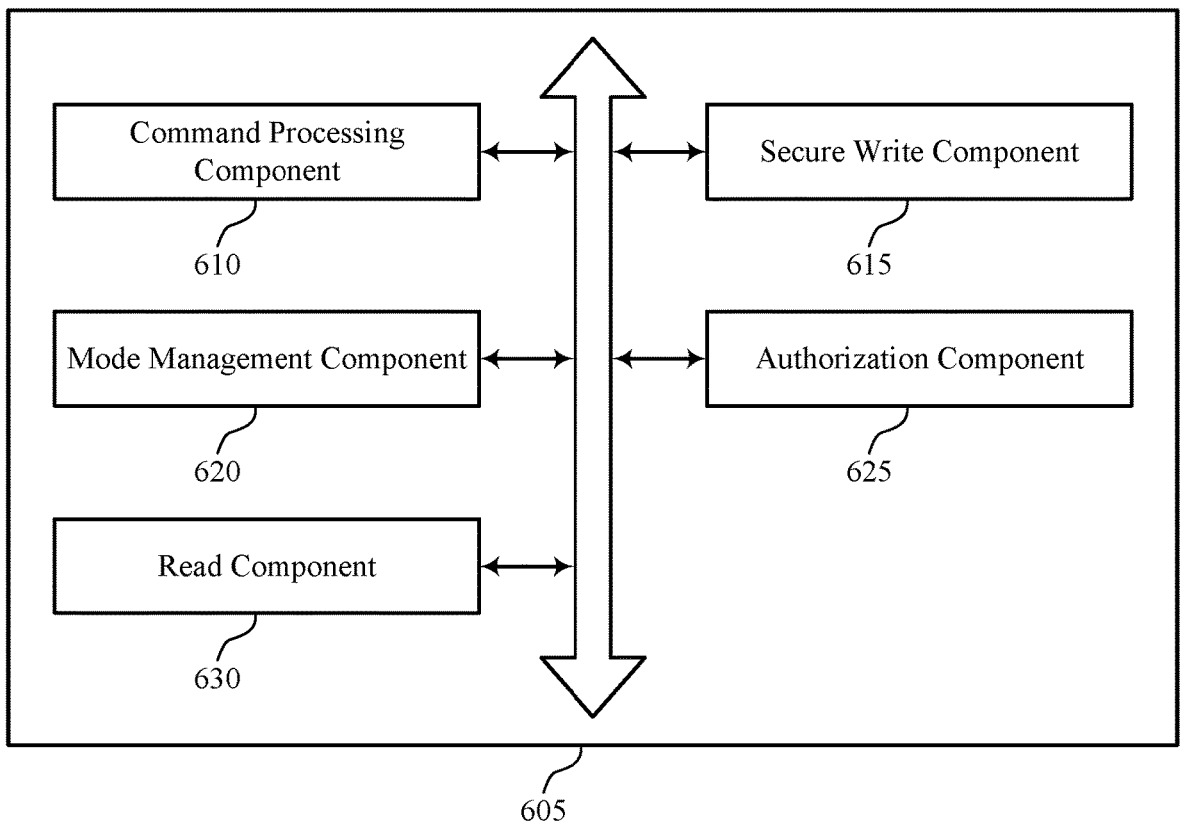
FIG. 6 shows a block diagram of an electronic device that supports techniques for secure writes by non-privileged users in accordance with examples as disclosed herein.

FIG. 6 shows a block diagram 600 of a memory device 605 that supports techniques for secure writes by non-privileged users in accordance with examples as disclosed herein. The memory device 605 may be an example of aspects of a memory device of a secure write system as described with reference to FIGS. 1 through 5. The memory device 605 may include a command processing component 610, a secure write component 615, a mode management component 620, an authorization component 625, and a read component 630. Each of these modules may communicate, directly or indirectly, with one another (e.g., via one or more buses).

The command processing component 610 may receive, at a memory device that includes a block of memory operating in a secure write mode, an append command to write a first data set to the block of memory at an address determined by the memory device. In some examples, receiving, at the memory device, a second append command to write a second data set to the block of memory operating in the secure write mode, where updating the pointer includes updating the pointer to an updated address within the block of memory for storing the second data set based on receiving the second append command. In some examples, the command processing component 610 may receive a third append command to write a third data set to the block of memory operating in the secure write mode.

In some examples, the command processing component 610 may identify, in the append command, a first memory address within the block of memory for writing the third data set. In some examples, the command processing component 610 may receive a fourth append command to write a fourth data set to the block of memory operating in the secure write mode. In some examples, the command processing component 610 may identify that the block of memory operating in the secure write mode is filled with data. In some examples, the command processing component 610 may identify a second block of memory operating in the secure write mode with space for storing data. In some examples, the command processing component 610 may receive a fifth append command to write a fifth data set to the block of memory operating in the secure write mode. In some examples, the command processing component 610 may identify that the blocks of memory operating in the secure write mode is filled with data. In some examples, the command processing component 610 may receive, at the memory device, a modify command to configure a first memory block from a first mode to the secure write mode. In some examples, the command processing component 610 may identify an authentication parameter associated with the modify command. In some examples, the command processing component 610 may receive, at the memory device, a reset command to reset the block of memory operating in the secure write mode. In some examples, the command processing component 610 may identify an authentication parameter associated with the reset command. In some examples, the command processing component 610 may receive, at the memory device, a read command to transmit data stored in one or more blocks of memory that are operating in the secure write mode. In some cases, the append command includes an indication of the block of memory associated with the first data set and does not include an indication of the address within the block of memory.

The secure write component 615 may identify a pointer to the address for storing the first data set within the block of memory based on receiving the append command. In some examples, the secure write component 615 may write the first data set to a first portion of the block of memory based on identifying the pointer to the address. In some examples, the secure write component 615 may update the pointer associated with the block of memory based on writing the first data set. In some examples, the secure write component 615 may identify the block of memory operating in the secure write mode based on an indication in the append command, where identifying the pointer is based on identifying the block of memory. In some examples, the secure write component 615 may write the second data set to a second portion of the block of memory based on the updated address. In some examples, the secure write component 615 may increment the pointer from the address to an updated address within the block of memory based on receiving the append command. In some examples, the secure write component 615 may receive, at the memory device, an indication within the append command to write the first data set in the secure write mode, where identifying the pointer is based on receiving the indication. In some examples, the secure write component 615 may write the third data set based on the updated pointer, failing to write the third data set to the block of memory, transmitting an error message, or a combination thereof based on receiving the first memory address. In some examples, the secure write component 615 may write the fourth data set to the second block of memory based on identifying the second block of memory. In some examples, the secure write component 615 may transmit an error message based on the identifying. In some examples, the secure write component 615 may update a register of the memory device to indicate that the block of memory has been reset based on verify that the reset command is from an authorized host device. In some examples, the secure write component 615 may update the pointer to a reset address of one or more blocks of memory configured in the secure write mode based on the verifying. In some examples, the secure write component 615 may update the pointer is based on a wear leveling operation for the memory device.

The mode management component 620 may transmit, to a host device, an indication that the memory device is operating in the secure write mode. In some examples, the mode management component 620 may configure the first memory block to operate in the secure write mode based on receiving the modify command. In some cases, the first mode includes an authentication mode. In some cases, the first memory block is configured to operate in the secure write mode based on operating in the authentication mode.

The authorization component 625 may verify that the modify command is from an authorized host device based on identifying the authentication parameter, where configuring the first memory block to operate in the secure write mode is based on verifying that the modify command is from the authorized host device. In some examples, the authorization component 625 may verify that the modify command is from the authorized host device is based on a message authentication code, cryptographic hash function, a digital signature, or a combination thereof. In some examples, the authorization component 625 may verify that a host device is authorized to configure the block of memory based on receiving the reset command. In some examples, the authorization component 625 may verify that the host device is an authorized sender of the reset command based on evaluating the authentication parameter. In some cases, the authentication parameter includes a message authentication code, cryptographic hash function, digital signature, or a combination thereof.

The read component 630 may transmit one or more data sets stored in the one or more blocks of memory to a host device based on receiving the read command.

Figure 7:
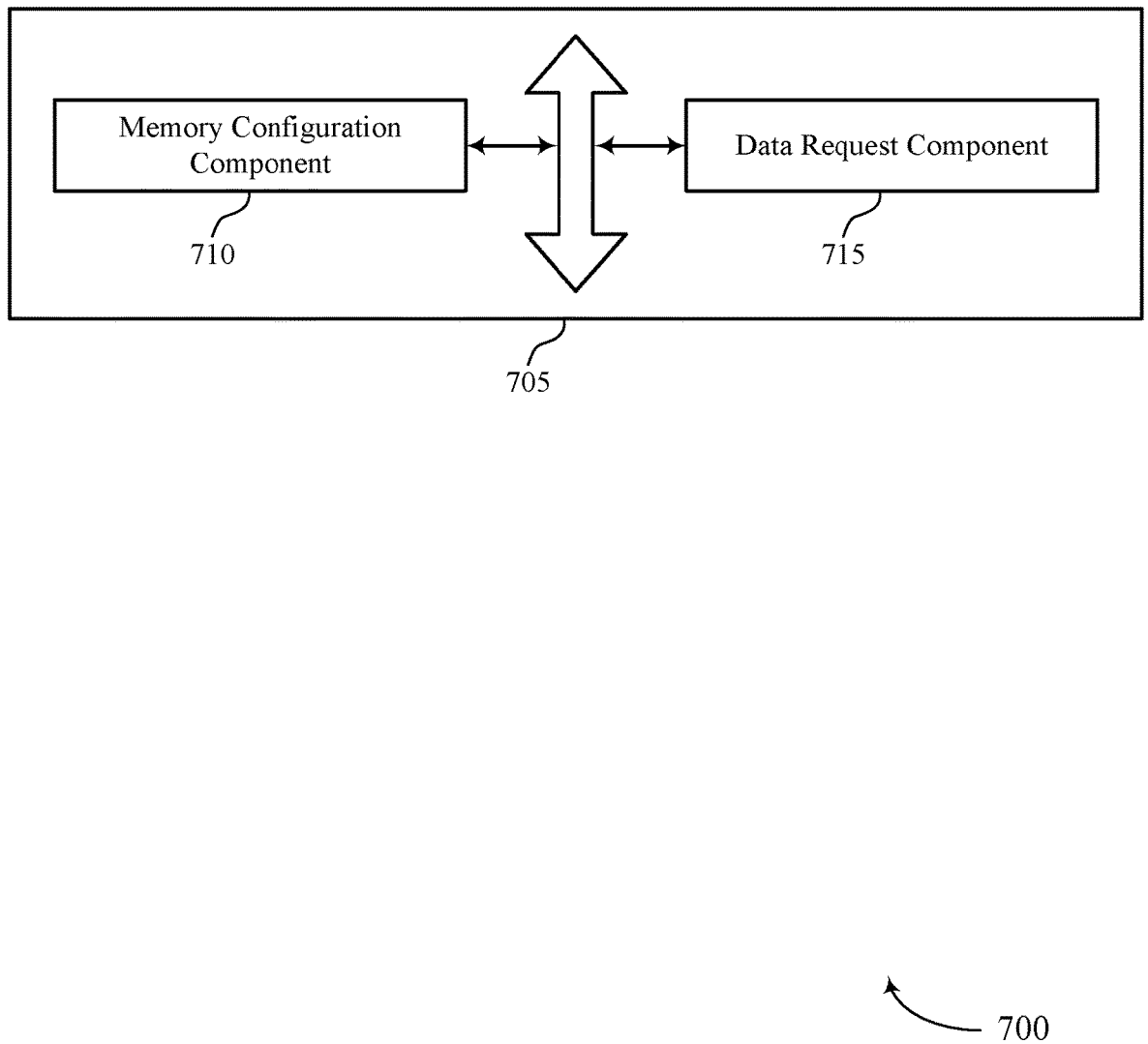
FIG. 7 shows a block diagram of a host device that supports techniques for secure writes by non-privileged users in accordance with examples as disclosed herein.

FIG. 7 shows a block diagram 700 of a host device 705 (e.g., a privileged device) that supports techniques for secure writes by non-privileged users in accordance with examples as disclosed herein. The host device 705 may be an example of aspects of a host device, a remote device, or a privileged user, or a combination thereof of a secure write system as described with reference to FIGS. 1 through 5. The host device 705 may include a memory configuration component 710 and a data request component 715. Each of these modules may communicate, directly or indirectly, with one another (e.g., via one or more buses).

The memory configuration component 710 may identify, by a host device, an electronic device including a memory device configurable to operate in a secure write mode. In some examples, the memory configuration component 710 may transmit, by the host device, a modify command to configure one or more memory blocks of the memory device to operate in the secure write mode, the modify command including an authentication parameter that indicates to the memory device that the host device is authorized to configure the one or more memory blocks. In some examples, transmit, from the host device, a reset command to reset the one or more memory blocks based on receiving the data, where the reset command includes the authentication parameter. In some examples, the memory configuration component 710 may receive, at the host device, an error indication associated with configuring the one or more memory blocks of the memory device to operate in the secure write mode, where the error indication is based on the modify command. In some cases, the authentication parameter includes a message authentication code, cryptographic hash function, digital signature, or a combination thereof.

The data request component 715 may transmit, from the host device, a read command to request data stored on the memory device, the read command including the authentication parameter. In some examples, the data request component 715 may receive the data stored in the one or more memory blocks operating in the secure write mode of the memory device based on transmitting the read command.

Figure 8:
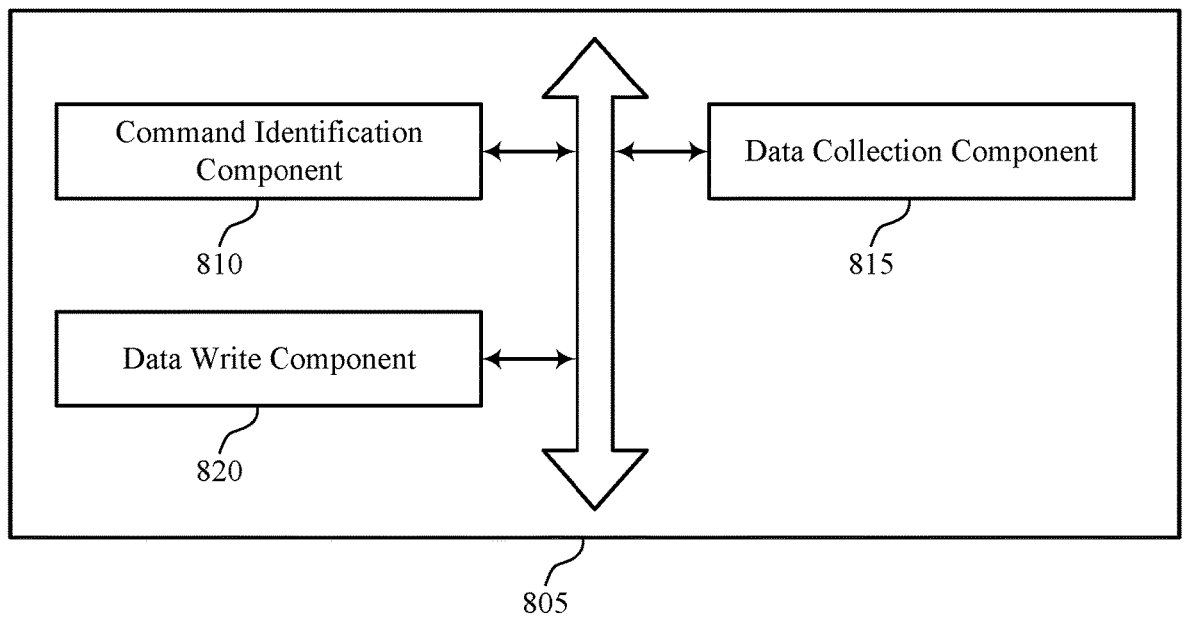
FIG. 8 shows a block diagram of an electronic device that supports techniques for secure writes by non-privileged users in accordance with examples as disclosed herein.

FIG. 8 shows a block diagram 800 of an electronic device 805 that supports techniques for secure writes by non-privileged users in accordance with examples as disclosed herein. The electronic device 805 may be an example of aspects of a host device, a non-privileged user, or a combination thereof of a secure write system as described with reference to FIGS. 1 through 5. The electronic device 805 may include a command identification component 810, a data collection component 815, and a data write component 820. Each of these modules may communicate, directly or indirectly, with one another (e.g., via one or more buses).

The command identification component 810 may receive, at an electronic device associated with a memory device, a modify command to configure a block of memory of the memory device to operate in a secure write mode. In some examples, the command identification component 810 may transmit, to the memory device, the modify command based on identifying that the modify command is to configure the block of memory.

The data collection component 815 may detect one or more conditions at the electronic device based on transmitting the modify command.

The data write component 820 may transmit, from the electronic device based on the one or more conditions and receiving the modify command, an append command to write data to the memory device operating in the secure write mode.

In some examples, the data write component 820 may receive, at the electronic device, an indication including an identifier of the block of memory operating in the secure write mode, where the append command includes the identifier of the block of memory operating in the secure write mode. In some cases, the append command includes an indication of the block of memory associated with the data and does not include an indication of an address within the block of memory.

Figure 9:
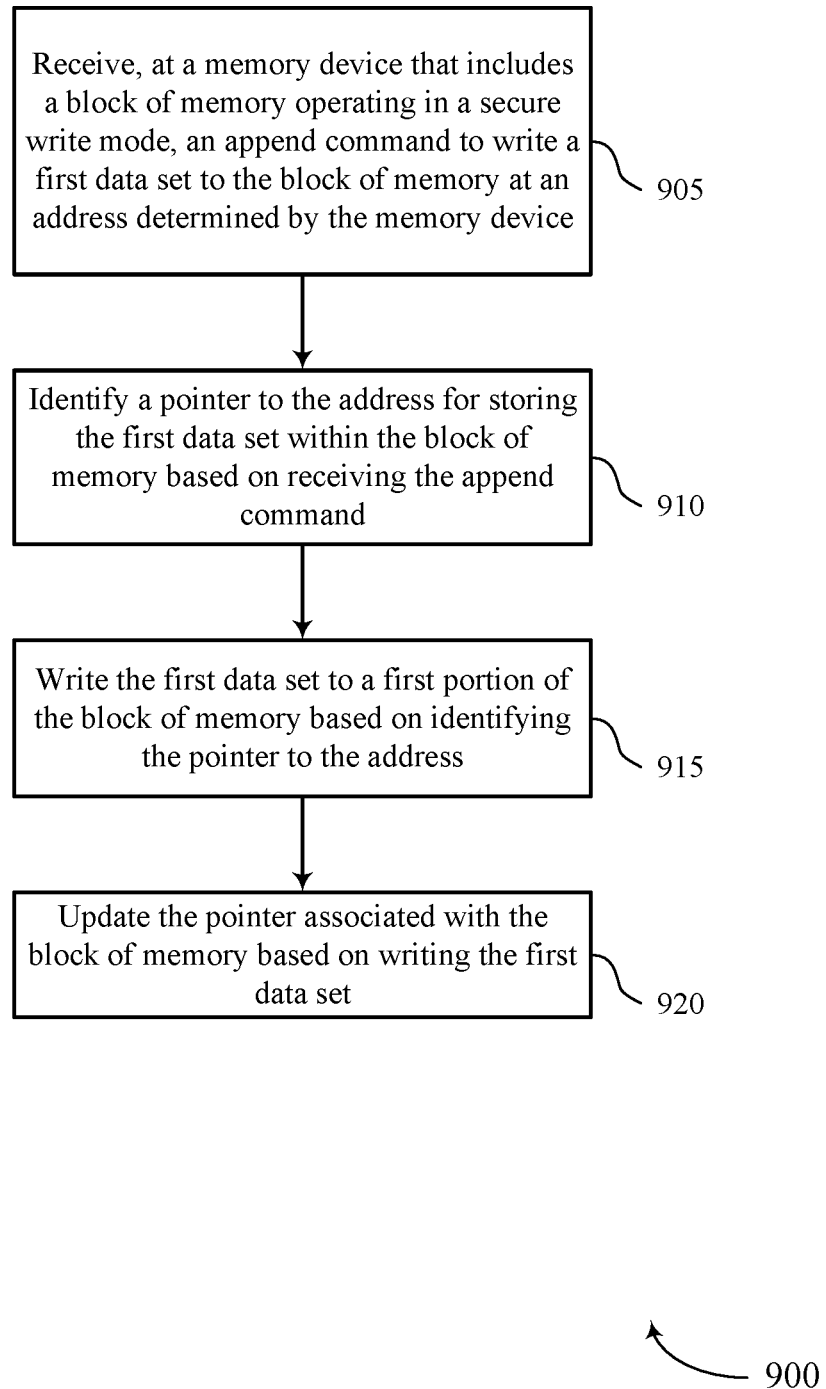
FIGS. 9 through 13 show flowcharts illustrating a method or methods that support techniques for secure writes by non-privileged users in accordance with examples as disclosed herein.

FIG. 9 shows a flowchart illustrating a method or methods 900 that supports techniques for secure writes by non-privileged users in accordance with aspects of the present disclosure. The operations of method 900 may be implemented by a memory device or its components as described herein. For example, the operations of method 900 may be performed by a memory device as described with reference to FIG. 6. In some examples, a memory device may execute a set of instructions to control the functional elements of the memory array to perform the described functions. Additionally or alternatively, a memory device may perform aspects of the described functions using special-purpose hardware.

At 905, the memory device that includes a block of memory operating in a secure write mode may receive an append command to write a first data set to the block of memory at an address determined by the memory device. The operations of 905 may be performed according to the methods described herein. In some examples, aspects of the operations of 905 may be performed by a command processing component as described with reference to FIG. 6.

At 910, the memory device may identify a pointer to the address for storing the first data set within the block of memory based on receiving the append command. The operations of 910 may be performed according to the methods described herein. In some examples, aspects of the operations of 910 may be performed by a secure write component as described with reference to FIG. 6.

At 915, the memory device may write the first data set to a first portion of the block of memory based on identifying the pointer to the address. The operations of 915 may be performed according to the methods described herein. In some examples, aspects of the operations of 915 may be performed by a secure write component as described with reference to FIG. 6.

At 920, the memory device may update the pointer associated with the block of memory based on writing the first data set. The operations of 920 may be performed according to the methods described herein. In some examples, aspects of the operations of 920 may be performed by a secure write component as described with reference to FIG. 6.

In some examples, an apparatus as described herein may perform a method or methods, such as the method 900. The apparatus may include features, means, or instructions (e.g., a non-transitory computer-readable medium storing instructions executable by a processor) for receiving, at a memory device that includes a block of memory operating in a secure write mode, an append command to write a first data set to the block of memory at an address determined by the memory device, identifying a pointer to the address for storing the first data set within the block of memory based on receiving the append command, writing the first data set to a first portion of the block of memory based on identifying the pointer to the address, and updating the pointer associated with the block of memory based on writing the first data set.

Some examples of the method 900 and the apparatus described herein may further include operations, features, means, or instructions for identifying the block of memory operating in the secure write mode based on an indication in the append command, where identifying the pointer may be based on identifying the block of memory.

Some examples of the method 900 and the apparatus described herein may further include operations, features, means, or instructions for receiving, at the memory device, a second append command to write a second data set to the block of memory operating in the secure write mode, where updating the pointer includes updating the pointer to an updated address within the block of memory for storing the second data set based on receiving the second append command, and writing the second data set to a second portion of the block of memory based on the updated address.

In some examples of the method 900 and the apparatus described herein, the append command includes an indication of the block of memory associated with the first data set and does not include an indication of the address within the block of memory.

In some examples of the method 900 and the apparatus described herein, updating the pointer may include operations, features, means, or instructions for incrementing the pointer from the address to an updated address within the block of memory based on receiving the append command.

Some examples of the method 900 and the apparatus described herein may further include operations, features, means, or instructions for transmitting, to a host device, an indication that the memory device may be operating in the secure write mode, and receiving, at the memory device, an indication within the append command to write the first data set in the secure write mode, where identifying the pointer may be based on receiving the indication.

Some examples of the method 900 and the apparatus described herein may further include operations, features, means, or instructions for receiving a third append command to write a third data set to the block of memory operating in the secure write mode, identifying, in the append command, a first memory address within the block of memory for writing the third data set, and writing the third data set based on the updated pointer, failing to write the third data set to the block of memory, transmitting an error message, or a combination thereof base at least in part on receiving the first memory address.

Some examples of the method 900 and the apparatus described herein may further include operations, features, means, or instructions for receiving, at the memory device, a modify command to configure a first memory block from a first mode to the secure write mode, and configuring the first memory block to operate in the secure write mode based on receiving the modify command.

In some examples of the method 900 and the apparatus described herein, the first mode includes an authentication mode, and the first memory block may be configured to operate in the secure write mode after operating in in the authentication mode.

Some examples of the method 900 and the apparatus described herein may further include operations, features, means, or instructions for identifying an authentication parameter associated with the modify command, and verifying that the modify command may be from an authorized host device based on identifying the authentication parameter, where configuring the first memory block to operate in the secure write mode may be based on verifying that the modify command may be from the authorized host device.

Some examples of the method 900 and the apparatus described herein may further include operations, features, means, or instructions for verifying that the modify command may be from the authorized host device may be based on a message authentication code, cryptographic hash function, a digital signature, or a combination thereof.

Some examples of the method 900 and the apparatus described herein may further include operations, features, means, or instructions for receiving, at the memory device, a reset command to reset the block of memory operating in the secure write mode, and verifying that a host device may be authorized to configure the block of memory based on receiving the reset command.

Some examples of the method 900 and the apparatus described herein may further include operations, features, means, or instructions for identifying an authentication parameter associated with the reset command, and verifying that the host device may be an authorized sender of the reset command based on evaluating the authentication parameter.

In some examples of the method 900 and the apparatus described herein, the authentication parameter includes a message authentication code, cryptographic hash function, digital signature, or a combination thereof.

Some examples of the method 900 and the apparatus described herein may further include operations, features, means, or instructions for updating a register of the memory device to indicate that the block of memory may have been reset based on verify that the reset command may be from an authorized host device.

Some examples of the method 900 and the apparatus described herein may further include operations, features, means, or instructions for updating the pointer to a reset address of one or more blocks of memory configured in the secure write mode based on the verifying.

Some examples of the method 900 and the apparatus described herein may further include operations, features, means, or instructions for updating the pointer to the reset address may be based on a wear leveling operation for the memory device.

Some examples of the method 900 and the apparatus described herein may further include operations, features, means, or instructions for receiving, at the memory device, a read command to transmit data stored in one or more blocks of memory that may be operating in the secure write mode, and transmitting one or more data sets stored in the one or more blocks of memory to a host device based on receiving the read command.

Figure 10:
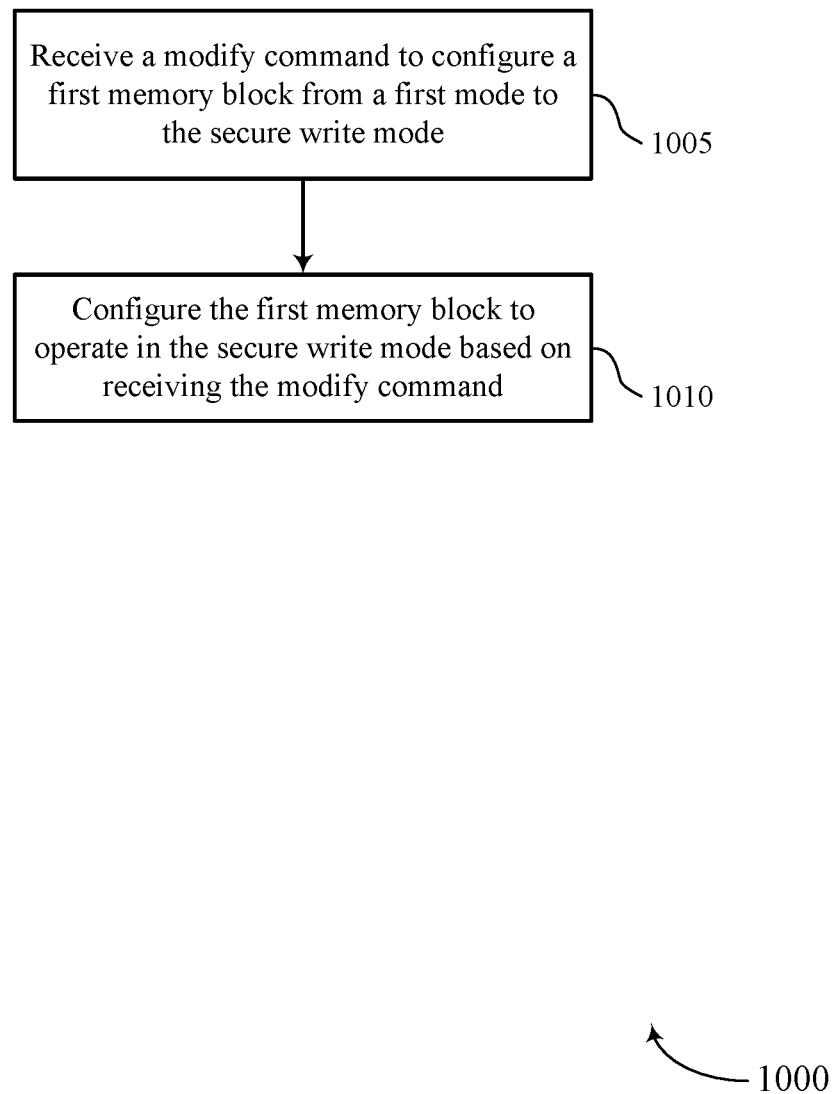

FIG. 10 shows a flowchart illustrating a method or methods 1000 that supports techniques for secure writes by non-privileged users in accordance with aspects of the present disclosure. The operations of method 1000 may be implemented by a memory device or its components as described herein. For example, the operations of method 1000 may be performed by a memory device as described with reference to FIG. 6. In some examples, a memory device may execute a set of instructions to control the functional elements of the memory array to perform the described functions. Additionally or alternatively, an electronic device may perform aspects of the described functions using special-purpose hardware.

At 1005, the memory device may receive a modify command to configure a first memory block from a first mode to the secure write mode. The operations of 1005 may be performed according to the methods described herein. In some examples, aspects of the operations of 1005 may be performed by a command processing component as described with reference to FIG. 6.

At 1010, the memory device may configure the first memory block to operate in the secure write mode based on receiving the modify command. The operations of 1010 may be performed according to the methods described herein. In some examples, aspects of the operations of 1010 may be performed by a mode management component as described with reference to FIG. 6.

Figure 11:
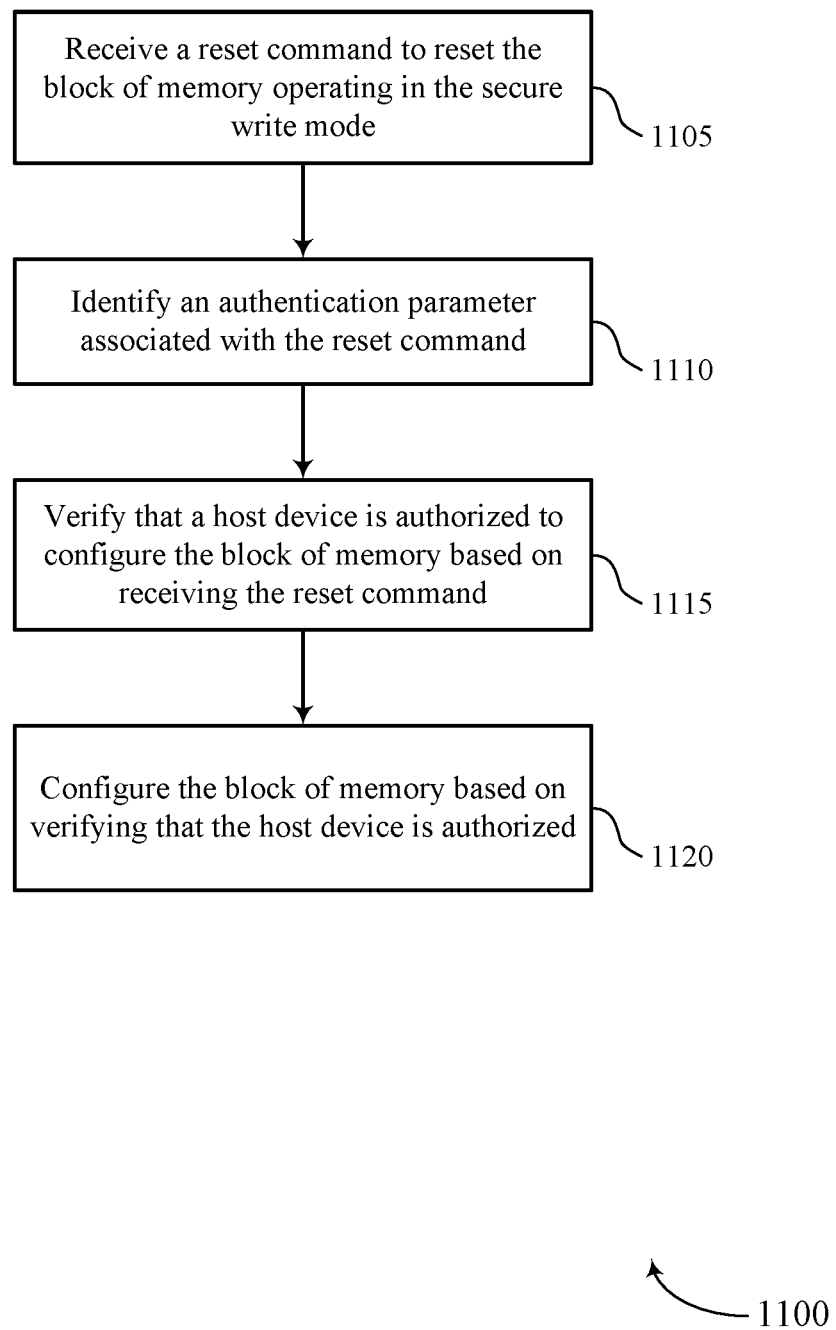

FIG. 11 shows a flowchart illustrating a method or methods 1100 that supports techniques for secure writes by non-privileged users in accordance with aspects of the present disclosure. The operations of method 1100 may be implemented by a memory device or its components as described herein. For example, the operations of method 1100 may be performed by a memory device as described with reference to FIG. 6. In some examples, a memory device may execute a set of instructions to control the functional elements of the memory array to perform the described functions. Additionally or alternatively, a memory device may perform aspects of the described functions using special-purpose hardware.

At 1105, the memory device may receive a reset command to reset the block of memory operating in the secure write mode. The operations of 1105 may be performed according to the methods described herein. In some examples, aspects of the operations of 1105 may be performed by a command processing component as described with reference to FIG. 6.

At 1110, the memory device may identify an authentication parameter associated with the reset command. The operations of 1110 may be performed according to the methods described herein. In some examples, aspects of the operations of 1110 may be performed by a command processing component as described with reference to FIG. 6.

At 1115, the memory device may verify that a host device is authorized to configure the block of memory based on receiving the reset command. In some cases, the memory device may verify that the host device is an authorized sender of the reset command based on evaluating the authentication parameter. The operations of 1115 may be performed according to the methods described herein. In some examples, aspects of the operations of 1115 may be performed by an authorization component as described with reference to FIG. 6.

At 1120, the memory device may configure the block of memory based on verifying that the host device is authorized. The operations of 1120 may be performed according to the methods described herein. In some examples, aspects of the operations of 1120 may be performed by an authorization component as described with reference to FIG. 6.

Figure 12:
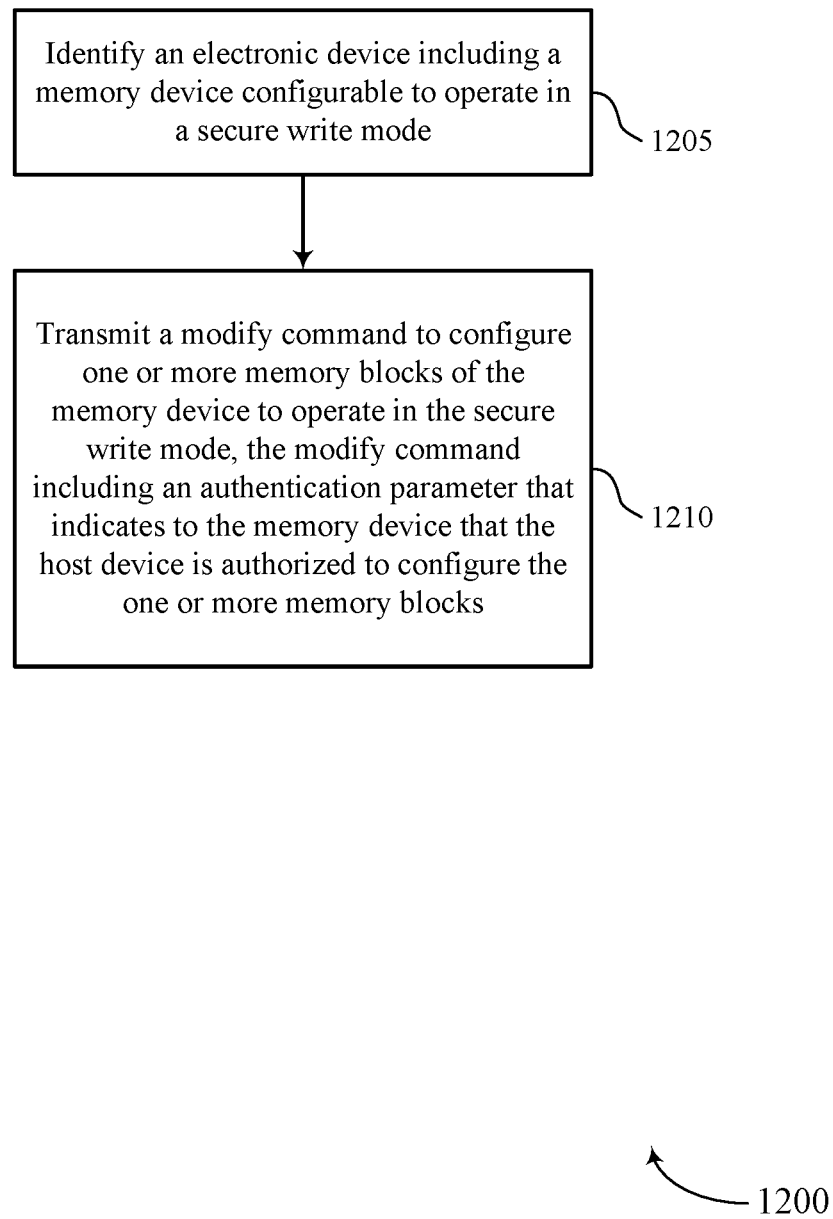

FIG. 12 shows a flowchart illustrating a method or methods 1200 that supports techniques for secure writes by non-privileged users in accordance with aspects of the present disclosure. The operations of method 1200 may be implemented by a host device or its components as described herein. For example, the operations of method 1200 may be performed by a host device as described with reference to FIG. 7. In some examples, a host device may execute a set of instructions to control the functional elements of the host device to perform the described functions. Additionally or alternatively, a host device may perform aspects of the described functions using special-purpose hardware.

At 1205, the host device may identify an electronic device including a memory device configurable to operate in a secure write mode. The operations of 1205 may be performed according to the methods described herein. In some examples, aspects of the operations of 1205 may be performed by a memory configuration component as described with reference to FIG. 7.

At 1210, the host device may transmit a modify command to configure one or more memory blocks of the memory device to operate in the secure write mode, the modify command including an authentication parameter that indicates to the memory device that the host device is authorized to configure the one or more memory blocks. The operations of 1210 may be performed according to the methods described herein. In some examples, aspects of the operations of 1210 may be performed by a memory configuration component as described with reference to FIG. 7.

In some examples, an apparatus as described herein may perform a method or methods, such as the method 1200. The apparatus may include features, means, or instructions (e.g., a non-transitory computer-readable medium storing instructions executable by a processor) for identifying, by a host device, an electronic device including a memory device configurable to operate in a secure write mode and transmitting, by the host device, a modify command to configure one or more memory blocks of the memory device to operate in the secure write mode, the modify command including an authentication parameter that indicates to the memory device that the host device is authorized to configure the one or more memory blocks.

In some examples of the method 1200 and the apparatus described herein, the authentication parameter includes a message authentication code, cryptographic hash function, digital signature, or a combination thereof.

Some examples of the method 1200 and the apparatus described herein may further include operations, features, means, or instructions for transmitting, from the host device, a read command to request data stored on the memory device, the read command including the authentication parameter, receiving the data stored in the one or more memory blocks operating in the secure write mode of the memory device based on transmitting the read command, and transmitting, from the host device, a reset command to reset the one or more memory blocks based on receiving the data, where the reset command includes the authentication parameter.

Some examples of the method 1200 and the apparatus described herein may further include operations, features, means, or instructions for receiving, at the host device, an error indication associated with configuring the one or more memory blocks of the memory device to operate in the secure write mode, where the error indication may be based on the modify command.

Figure 13:
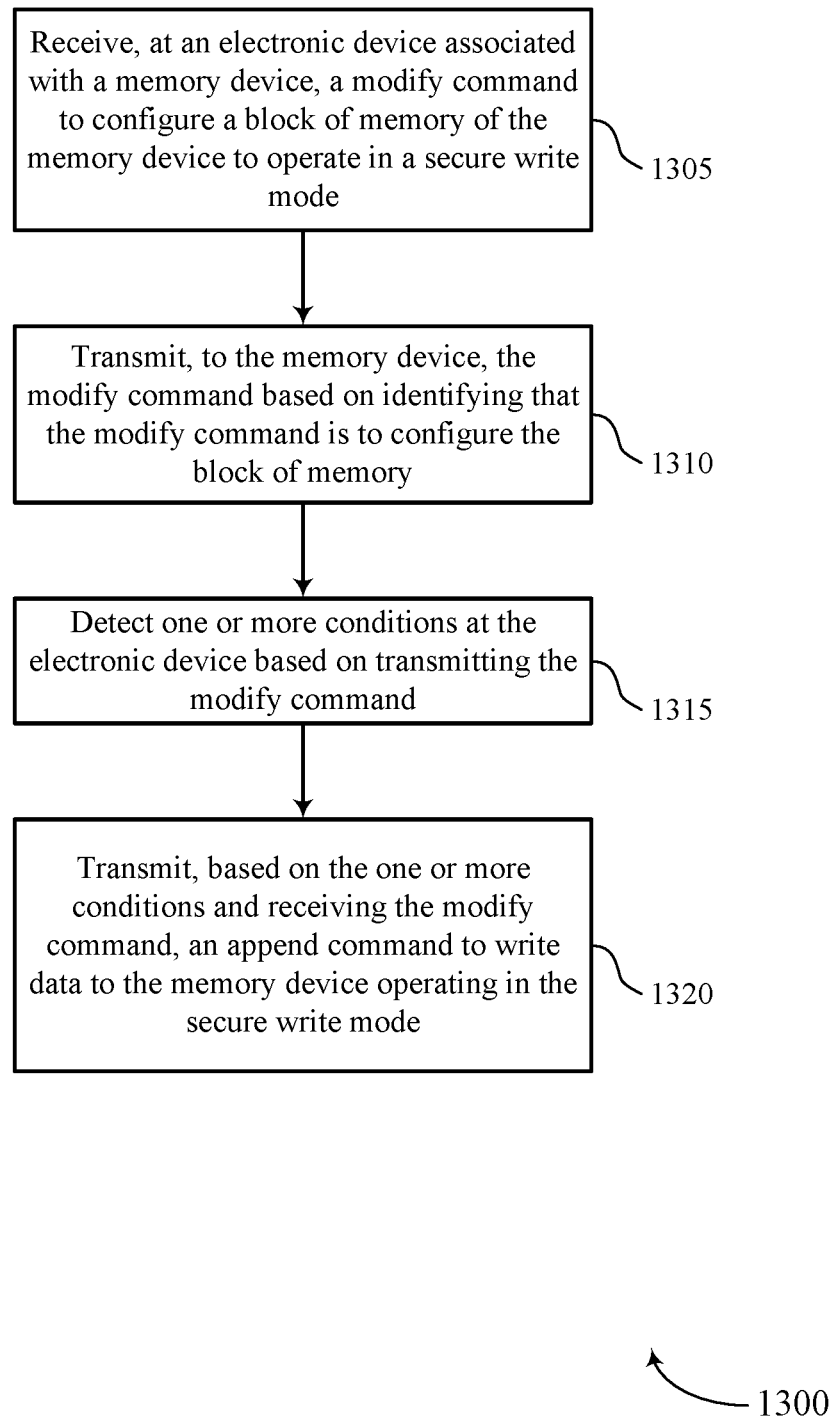

FIG. 13 shows a flowchart illustrating a method or methods 1300 that supports techniques for secure writes by non-privileged users in accordance with aspects of the present disclosure. The operations of method 1300 may be implemented by an electronic device or its components as described herein. For example, the operations of method 1300 may be performed by an electronic device as described with reference to FIG. 8. In some examples, an electronic device may execute a set of instructions to control the functional elements of the electronic device to perform the described functions. Additionally or alternatively, an electronic device may perform aspects of the described functions using special-purpose hardware.

At 1305, the electronic device associated with a memory device may receive a modify command to configure a block of memory of the memory device to operate in a secure write mode. The operations of 1305 may be performed according to the methods described herein. In some examples, aspects of the operations of 1305 may be performed by a command identification component as described with reference to FIG. 8.

At 1310, the electronic device may transmit, to the memory device, the modify command based on identifying that the modify command is to configure the block of memory. The operations of 1310 may be performed according to the methods described herein. In some examples, aspects of the operations of 1310 may be performed by a command identification component as described with reference to FIG. 8.

At 1315, the electronic device may detect one or more conditions at the electronic device based on transmitting the modify command. The operations of 1315 may be performed according to the methods described herein. In some examples, aspects of the operations of 1315 may be performed by a data collection component as described with reference to FIG. 8.

At 1320, the electronic device may transmit, based on the one or more conditions and receiving the modify command, an append command to write data to the memory device operating in the secure write mode. The operations of 1320 may be performed according to the methods described herein. In some examples, aspects of the operations of 1320 may be performed by a data write component as described with reference to FIG. 8.

In some examples, an apparatus as described herein may perform a method or methods, such as the method 1300. The apparatus may include features, means, or instructions (e.g., a non-transitory computer-readable medium storing instructions executable by a processor) for receiving, at an electronic device associated with a memory device, a modify command to configure a block of memory of the memory device to operate in a secure write mode, transmitting, to the memory device, the modify command based on identifying that the modify command is to configure the block of memory, detecting one or more conditions at the electronic device based on transmitting the modify command, and transmitting, from the electronic device based on the one or more conditions and receiving the modify command, an append command to write data to the memory device operating in the secure write mode.

Some examples of the method 1300 and the apparatus described herein may further include operations, features, means, or instructions for receiving, at the electronic device, an indication including an identifier of the block of memory operating in the secure write mode, where the append command includes the identifier of the block of memory operating in the secure write mode.

In some examples of the method 1300 and the apparatus described herein, the append command includes an indication of the block of memory associated with the data and does not include an indication of an address within the block of memory.

It should be noted that the methods described above describe possible implementations, and that the operations and the steps may be rearranged or otherwise modified and that other implementations are possible. Furthermore, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "substantially" means that the modified characteristic (e.g., a verb or adjective modified by the term substantially) need not be absolute but is close enough to achieve the advantages of the characteristic.

The devices discussed herein, including an electronic device, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory device, comprising:
  a memory array comprising a block of memory operating in a secure write mode, wherein the secure write mode allows both authorized host devices and non-authorized host devices to append data to the block of memory, and prevents non-authorized host devices from modifying data within the block of memory; and
  a controller coupled with the memory array, wherein the controller is operable to cause the memory device to:
    receive an append command to write a first data set to the block of memory at an address determined by the memory device;
    identify a pointer to the address for storing the first data set within the block of memory based at least in part on receiving the append command;
    write the first data set to a first portion of the block of memory based at least in part on identifying the pointer to the address; and
    update the pointer associated with the block of memory based at least in part on writing the first data set.

2. The memory device of claim 1, wherein the controller is further operable to cause the memory device to:
  identify the block of memory operating in the secure write mode based at least in part on an indication in the append command, wherein identifying the pointer is based at least in part on identifying the block of memory.

3. The memory device of claim 2, wherein the controller is further operable to cause the memory device to:
  receive a second append command to write a second data set to the block of memory operating in the secure write mode, wherein updating the pointer comprises updating the pointer to an updated address within the block of memory for storing the second data set based at least in part on receiving the second append command; and
  write the second data set to a second portion of the block of memory based at least in part on the updated address.

4. The memory device of claim 1, wherein the append command includes an indication of the block of memory associated with the first data set and does not include an indication of the address within the block of memory.

5. The memory device of claim 1, wherein updating the pointer comprises the controller being operable to cause the memory device to:

increment the pointer from the address to an updated address within the block of memory based at least in part on receiving the append command.

6. The memory device of claim 1, wherein the controller is further operable to cause the memory device to:
transmit, to a host device, an indication that the memory device is operating in the secure write mode; and
receive, at the memory device, an indication within the append command to write the first data set in the secure write mode, wherein identifying the pointer is based at least in part on receiving the indication.

7. The memory device of claim 1, wherein the controller is further operable to cause the memory device to:
receive a fourth append command to write a fourth data set to the block of memory operating in the secure write mode;
identify that the block of memory operating in the secure write mode is filled with data;
identify a second block of memory operating in the secure write mode with space for storing data; and
write the fourth data set to the second block of memory based at least in part on identifying the second block of memory.

8. The memory device of claim 1, wherein the controller is further operable to cause the memory device to:
receive a modify command to configure a first memory block from a first mode to the secure write mode; and
configure the first memory block to operate in the secure write mode based at least in part on receiving the modify command.

9. The memory device of claim 8, wherein the controller is further operable to cause the memory device to:
identify an authentication parameter associated with the modify command; and
verify that the modify command is from an authorized host device based at least in part on identifying the authentication parameter, wherein configuring the first memory block to operate in the secure write mode is based at least in part on verifying that the modify command is from the authorized host device.

10. The memory device of claim 1, wherein updating the pointer is based at least in part on a wear leveling operation for the memory device.

11. The memory device of claim 1, wherein the controller is further operable to cause the memory device to:
receive a read command to transmit data stored in one or more blocks of memory that are operating in the secure write mode; and
transmit one or more data sets stored in the one or more blocks of memory to a host device based at least in part on receiving the read command.

12. The memory device of claim 1, wherein the controller is further operable to cause the memory device to:
receive a modify command to modify a second data set stored in the block of memory;
identify an authentication parameter associated with the modify command;
verify that the modify command is from an authorized host device based at least in part on identifying the authentication parameter; and
modify the second data set stored within the block of memory based at least in part on the block of memory operating in the secure write mode and verifying that the modify command is from the authorized host device.

13. The memory device of claim 1, wherein the controller is further operable to cause the memory device to:
receive a modify command to modify a second data set stored in the block of memory;
determine that the modify command is from a non-authorized host device; and
prevent the second data set stored the block of memory from being modified based at least in part on the block of memory operating in the secure write mode and determining that the modify command is from the non-authorized host device.

14. A method, comprising:
receiving, at a memory device that includes a block of memory operating in a secure write mode, an append command to write a first data set to the block of memory at an address determined by the memory device, wherein the secure write mode allows both authorized host devices and non-authorized host devices to append data to the block of memory, and prevents non-authorized host devices from modifying data within the block of memory;
identifying a pointer to the address for storing the first data set within the block of memory based at least in part on receiving the append command;
writing the first data set to a first portion of the block of memory based at least in part on identifying the pointer to the address; and
updating the pointer associated with the block of memory based at least in part on writing the first data set.

15. The method of claim 14, further comprising:
identifying the block of memory operating in the secure write mode based at least in part on an indication in the append command, wherein identifying the pointer is based at least in part on identifying the block of memory.

16. The method of claim 15, further comprising:
receiving, at the memory device, a second append command to write a second data set to the block of memory operating in the secure write mode, wherein updating the pointer comprises updating the pointer to an updated address within the block of memory for storing the second data set based at least in part on receiving the second append command; and
writing the second data set to a second portion of the block of memory based at least in part on the updated address.

17. The method of claim 14, wherein the append command includes an indication of the block of memory associated with the first data set and does not include an indication of the address within the block of memory.

18. The method of claim 14, wherein updating the pointer comprises:
incrementing the pointer from the address to an updated address within the block of memory based at least in part on receiving the append command.

19. The method of claim 14, further comprising:
transmitting, to a host device, an indication that the memory device is operating in the secure write mode; and
receiving, at the memory device, an indication within the append command to write the first data set in the secure write mode, wherein identifying the pointer is based at least in part on receiving the indication.

20. The method of claim 14, further comprising:
receiving a fourth append command to write a fourth data set to the block of memory operating in the secure write mode;
identifying that the block of memory operating in the secure write mode is filled with data;

identifying a second block of memory operating in the secure write mode with space for storing data; and writing the fourth data set to the second block of memory based at least in part on identifying the second block of memory.

21. The method of claim 14, further comprising:

receiving, at the memory device, a modify command to configure a first memory block from a first mode to the secure write mode; and configuring the first memory block to operate in the secure write mode based at least in part on receiving the modify command.

22. A non-transitory computer-readable medium storing code comprising instructions which, when executed by a processor of an electronic device, cause the electronic device to:

receive, at a memory device that includes a block of memory operating in a secure write mode, an append command to write a first data set to the block of memory at an address determined by the memory device, wherein the secure write mode allows both authorized host devices and non-authorized host devices to append data to the block of memory, and prevents non-authorized host devices from modifying data within the block of memory;

identify a pointer to the address for storing the first data set within the block of memory based at least in part on receiving the append command;

write the first data set to a first portion of the block of memory based at least in part on identifying the pointer to the address; and update the pointer associated with the block of memory based at least in part on writing the first data set.

* * * * *